(12) United States Patent
Cho

(10) Patent No.: US 8,583,916 B2
(45) Date of Patent: Nov. 12, 2013

(54) SYSTEM AND METHOD FOR ISSUING DIGITAL CERTIFICATE USING ENCRYPTED IMAGE

(75) Inventor: Sung-Woo Cho, Gwangjin-gu (KR)

(73) Assignee: Olcorps Co., Ltd, Seoul (KR)

( * ) Notice: Subject to any disclaimer, the term of this patent is extended or adjusted under 35 U.S.C. 154(b) by 956 days.

(21) Appl. No.: 12/573,987

(22) Filed: Oct. 6, 2009

(65) Prior Publication Data
US 2010/0088507 A1    Apr. 8, 2010

(30) Foreign Application Priority Data

Oct. 6, 2008 (KR) .................. 10-2008-0097667

(51) Int. Cl.
   *H04L 29/06* (2006.01)
(52) U.S. Cl.
   USPC .............................. 713/156; 726/5
(58) Field of Classification Search
   None
   See application file for complete search history.

(56) References Cited

U.S. PATENT DOCUMENTS

| 7,207,480 B1* | 4/2007 | Geddes ..................... 235/380 |
| 2002/0129257 A1* | 9/2002 | Parmelee et al. ............. 713/180 |
| 2003/0099374 A1* | 5/2003 | Choi et al. .................... 382/100 |

FOREIGN PATENT DOCUMENTS

JP    2003-036231    2/2003

OTHER PUBLICATIONS

Jonathan Cummins, et al, Steganography and digital watermarking, 2004, pp. 1-23, School of Computer Science, The University of Birmingham.

* cited by examiner

*Primary Examiner* — Minh Dinh
(74) *Attorney, Agent, or Firm* — Sherr & Jiang, PLLC

(57) ABSTRACT

The present invention relates to a system and method for issuing a digital certificate using an encrypted image, in which a digital certificate is sealed in a digital envelope image so as to protect a digital certificate user from damages caused by hacking, phishing attacks and the like in the course of issuance, update and re-issuance of the digital certificate, and the method for issuing a digital certificate comprises the steps of: storing a user select image for issuing the digital certificate, by a proxy server or a certificate server; and requesting the certificate server to issue the digital certificate and, if the digital certificate is issued, creating a sealed digital envelope image by combining the digital certificate with the user select image and transmitting the digital envelope image to a user terminal.

3 Claims, 21 Drawing Sheets

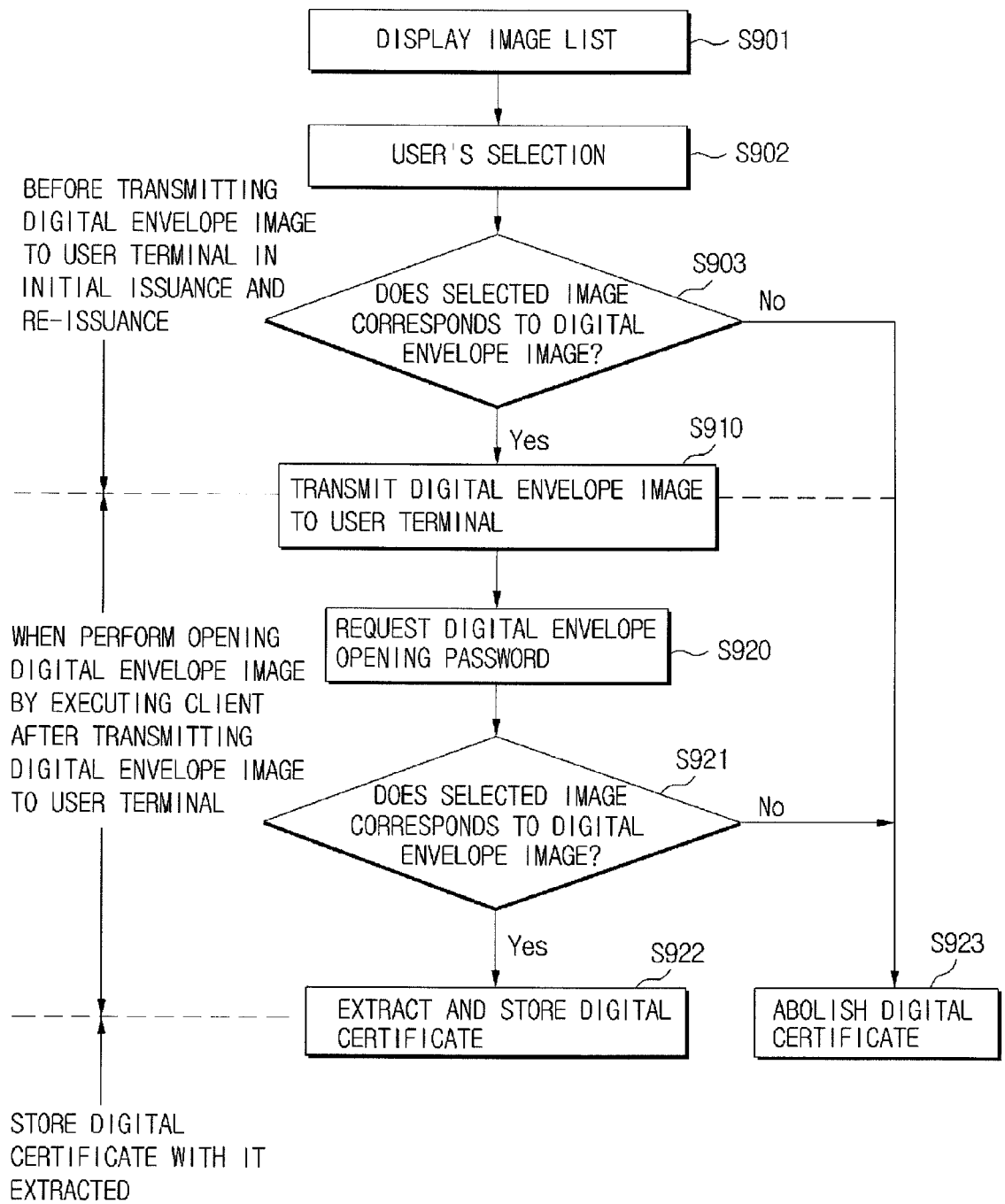

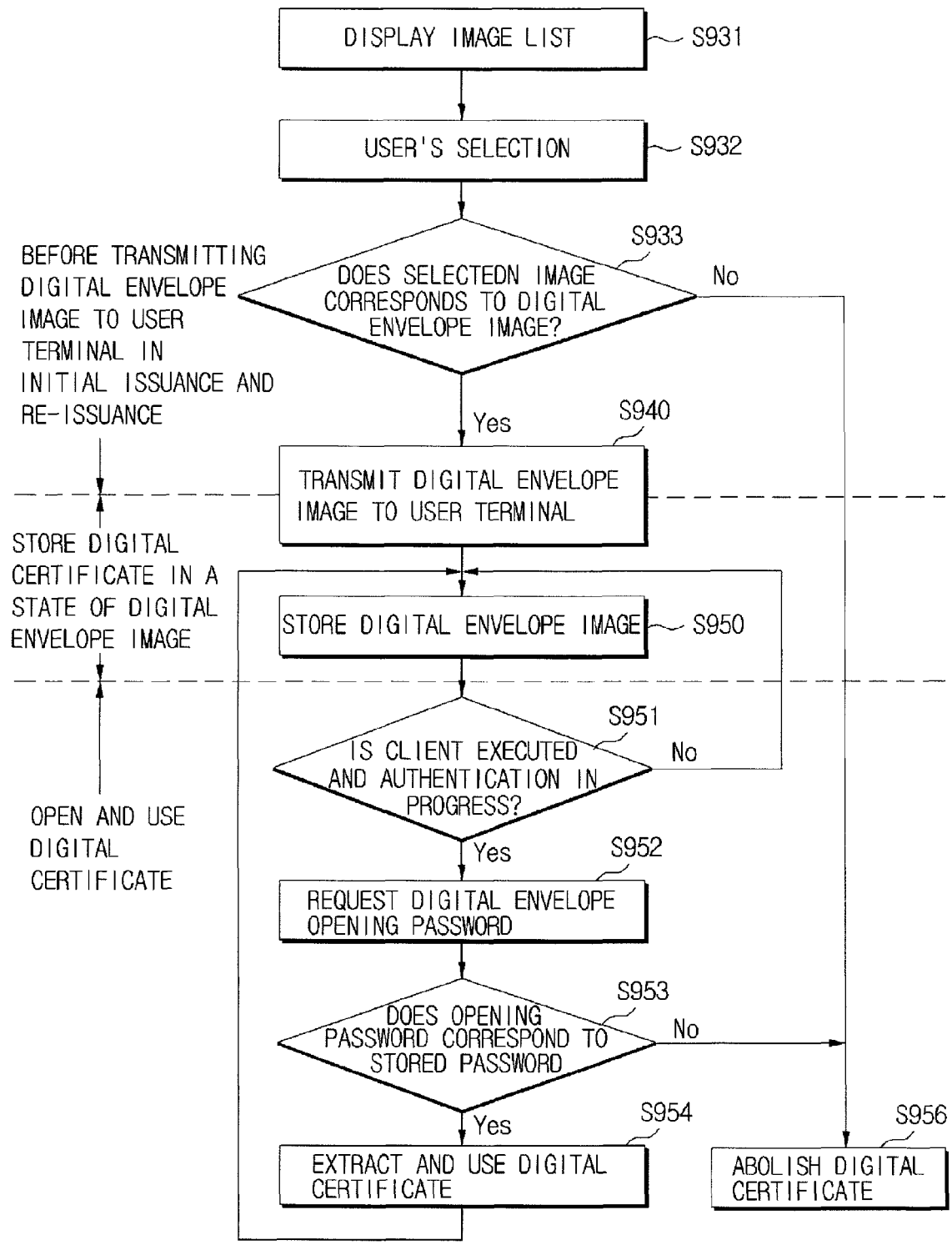

SYSTEM AND METHOD FOR ISSUING DIGITAL CERTIFICATE USING ENCRYPTED IMAGE

CROSS REFERENCE TO PRIOR APPLICATIONS

This application claims priority to Korean Patent Application No. 10-2008-0097667 (filed on Oct. 6, 2008) which is hereby incorporated by reference in its entirety.

BACKGROUND OF THE INVENTION

1. Field of the Invention

The present invention relates to issuance of a digital certificate, and more particularly to, a system and method for issuing a digital certificate using an encrypted image, in which a digital certificate is sealed in a digital envelope image so as to protect a digital certificate user from damages caused by hacking, phishing attacks and the like in the course of issuance, update and re-issuance of the digital certificate.

2. Background of the Related Art

The present invention relates to issuance of a digital certificate, and more particularly to, a system and method for issuing a digital certificate using an encrypted image, in which a digital certificate is sealed in a digital envelope image so as to protect a digital certificate user from damages caused by hacking, phishing attacks and the like in the course of issuance, update and re-issuance of the digital certificate.

The present invention relates to issuance of a digital certificate, and more particularly to, a system and method for issuing a digital certificate using an encrypted image, in which a digital certificate is sealed in a digital envelope image so as to protect a digital certificate user from damages caused by hacking, phishing attacks and the like in the course of issuance, update and re-issuance of the digital certificate.

Currently, in a public key cryptosystem, encryption and decryption are performed using a public key and a private key. Anyone can access the public key through a directory server unit, and a digital document signed by using the private key which is a counterpart of the public key is certified as one written by a specific user.

It is true that a digital certificate system using such a public key cryptosystem becomes a basic assumption for both the Internet banking and the electronic commerce transaction.

FIGS. 1 and 2 are signal flowcharts illustrating a digital certificate issuing procedure and a digital certificate updating/re-issuing procedure according to the prior art.

Currently, a digital certificate is initially issued by performing a procedure for confirming identity of a user, providing a security card and registering the user in a certificate authority (CA) server through a face-to-face confirming procedure. Such a face-to-face confirming procedure is free from worrying about hacking or phishing attacks.

However, in re-issuance or the like of the digital certificate after the initial issuing procedure, personal authentication information is transmitted on-line through a network in order to confirm whether the user is valid without a separate face-to-face confirming procedure. Therefore, there is a risk that the personal authentication information will be leaked to hackers or third parties.

One of reasons that further increases such a risk is that the personal authentication information is an account number, a password, a security card or the like, which is constructed by relatively simple means based on some numerals and texts, and thus personal authentication information can also be leaked by a well-known hacking method such as keyboard hacking, phishing or the like.

Of course, it is also true that a variety of insurance companies, medical institutions, financial institutions, certificate authorities and the like provide programs for preventing keyboard hacking or phishing attacks. However, since hacking techniques are also advanced together with the hacking prevention programs, there is a problem in that a conventional digital certificate issuing system cannot ensure absolute safety.

Moreover, since the programs or the like for preventing keyboard hacking or phishing attacks are provided mainly by the certificate authorities in reality, it is difficult to prevent the hacking or phishing attacks between users and certificate agencies, such as financial institutions, hospitals, insurance companies and the like, having a variety of certificate issuing procedures.

In addition, since an issued digital certificate is generally stored in a PC or a portable storage medium, theft of the digital certificate is not prevented at all in the digital certificate storing process.

SUMMARY OF THE INVENTION

Therefore, the present invention has been made to solve the problems involved in a digital certificate issuing procedure and a digital certificate updating/re-issuing procedure according to the prior art, and it is an object of the present invention to provide a method of issuing, updating, re-issuing and storing a digital certificate, which can prevent the abuse of the digital certificate caused by discard and re-issuance of the digital certificate by a third party even if personal information of a user is leaked through phishing, hacking attacks or the like, while maintaining a previously constructed digital certificate issuing, updating and re-issuing system.

Another object of the present invention is provide a method of issuing, updating, re-issuing and storing a digital certificate, which can enhance recognizability and intuitiveness of a user on information such as the purpose use of the digital certificate, institutions using the digital certificate, expiry date of the digital certificate and like, when there exists various kinds of digital certificates or the digital certificate is used in a cellular phone having a small display window.

Yet another object of the present invention is to provide a method in which, a proxy server of banks, hospitals, insurance companies, contents providing companies or the like, but not a certificate server that creates the digital certificate performs the registering and sealing of a digital envelope image, thereby minimizing damages caused by hacking and phishing attacks in the course of issuance, update, re-issuance and storage of a digital certificate.

Still another object of the present invention is to provide a method of issuing, updating, re-issuing and storing a digital certificate, in which a user, but not a server of a certificate authority creating the digital certificate, selects and seals a digital envelope image and backs up a backup copy of an encrypted image into a server of a certificate agency such as a bank, a hospital, an insurance company, a contents providing company and the like, thereby enhancing the effect of preventing hacking attacks as well as the stability and efficiency of the updating and re-issuing procedure.

To accomplish the above objects, according to one aspect of the present invention, there is provided a method of issuing a digital certificate using an encrypted image, the method including the steps of: storing a user select image for issuing the digital certificate; and creating a sealed digital envelope image by combining the digital certificate with the user select image when the digital certificate is issued, and transmitting the digital envelope image to a user terminal.

Preferably, the step of creating and transmitting the digital envelope image to the user terminal may be performed by a proxy serer, but not a certificate server that issues the digital certificate.

Preferably, the step of creating and transmitting the digital envelope image to the user terminal may be performed by a certificate server that issues the digital certificate performs.

Also, preferably, the sealed digital envelope image may be created by combining the digital certificate and the user select image using a steganography technology, and is visually the same as the user select image.

Also, preferably, the user select image may be any one an image which is easy for a user to remember as an image selected among images provided through the server, an image randomly selected by the user and submitted to an institution operating the server in the form of a picture file, and an image which is selectively combined by the user and implemented in the form of an avatar among images provided through the server.

In addition, preferably, the user select image may include a logo of an institution operating the server, an expiry date or business information of the institution operating the server.

In addition, preferably, the step of storing the user select image may further include the step of storing a user-registered sound source, wherein the user-registered sound source includes a guide to digital certificate notifications, user personal information or user-related contents.

Moreover, preferably, the digital envelope image created by combining the digital certificate with the user select image may be transmitted to the user terminal only when a valid authentication is accomplished through an authentication procedure for confirming identity of the user.

Besides, preferably, when the digital envelope image is transmitted to the user terminal, the digital envelope image may be opened and the digital certificate and the user select image are separately stored, or the digital envelope image is stored in a sealed state.

Further, preferably, an authentication procedure for confirming identity of the user may be performed in order to open the sealed digital envelope image, and the digital envelope image may be opened only when a valid authentication is accomplished through the authentication procedure.

Also, preferably, the authentication procedure for confirming identity of the user may be performed by requesting to select an image among different images transmitted together with the digital envelope image, requesting to input a digital envelope opening password assigned when the digital envelope image is sealed, confirming the identity using user's biological information, or through a selective combination thereof.

To accomplish the above objects, according to another aspect of the present invention, there is provided a method of allowing a proxy server to issue a digital certificate using encrypted images, the method including the steps of: receiving a user identification code created through user registration in a certificate server; storing a user select image; transmitting digital certificate issuance request data to the certificate server; and receiving a digital certificate issued by the certificate server, creating a sealed digital envelope image by combining the digital certificate with the user select image and transmitting the sealed digital envelope image to a user terminal.

Preferably, when the user identification code received by the proxy server is created by re-issuance of the digital certificate, the user identification code (code_identify) may be created after performing the steps of deleting a digital certificate abolished by the certificate server and storing a state of the abolished digital certificate.

Also, preferably, when the user identification code received by the proxy server is created by re-issuance of the digital certificate, a user may be registered and the user identification code (code_identify) may be created only when identity of the user is confirmed using the user select image stored in an image server operated in cooperation with the proxy server.

In addition, preferably, the sealed digital envelope image may be created by combining the digital certificate and the user select image using a steganography technology, and is visually the same as the user select image.

Further, preferably, a digital envelope opening password for opening the sealed digital envelope image may be created and transmitted to a user by the certificate server, or may be designated by the user through the proxy server.

To accomplish the above objects, according to yet another aspect of the present invention, there is provided a method of allowing a certificate server to issue a digital certificate using encrypted images, the method including the steps of: registering a user using personal information collected through a proxy server and storing a user select image; creating a user identification code and receiving digital certificate issuance request data through a user terminal; and issuing a digital certificate, creating a sealed digital envelope image by combining the issued digital certificate with the user select image and transmitting the sealed digital envelope image to the user terminal.

Preferably, the sealed digital envelope image may be created by combining the digital certificate and the user select image using a steganography technology, and may be visually the same as the user select image.

In addition, preferably, a digital envelope opening password for opening the sealed digital envelope image may be created and transmitted to a user by the certificate server, or may be designated by the user through the proxy server.

To accomplish the above objects, according to still another aspect of the present invention, there is provided a method for issuing a digital certificate using encrypted images, the method including the steps of: allowing a user terminal to transmit a digital certificate issuance request signal to a certificate server; allowing the user terminal to receive a digital certificate issued by the certificate server through a client; allowing the user terminal to create a sealed digital envelope image by combining the received digital certificate with a user select image; and allowing the user terminal to transmit the sealed digital envelope image to a proxy server.

Preferably, the sealed digital envelope image may be created by combining the digital certificate and the user select image in a steganography technology, and may be visually the same as the user select image.

In addition, preferably, in order to issue the digital certificate, the method may further include the steps of: allowing the proxy server to confirm identity of a user when the proxy server receives a registration application signal from the user terminal; allowing the proxy server to confirm identity of a user when the proxy server receives a registration application signal from the user terminal; allowing the proxy server to transmit issuance application data (data_application) including personal information (info_personal) of the user to the certificate server; allowing the proxy server to receive a user identification code (code_identify) created by the certificate server; allowing the proxy server to transmit a reference number/authentication code to the user terminal to allow the client create to create a signature key pair consisting of a public key and a private key; and allowing the user terminal to transmit digital certificate issuance request data (data_request) including the public key and the user identification code to the certificate server.

Preferably, the step of allowing the user terminal to create a sealed digital envelope image may selectively include the step of creating a digital envelope opening password and the step of registering biological information, or comprises both of the two steps.

To accomplish the above objects, according to a further aspect of the present invention, there is provided a system for issuing a digital certificate using encrypted images, the system including: a user terminal comprising a digital envelope opening module and a digital certificate extracting module; a proxy server comprising an image server unit for storing a user select image and a digital envelope image creating unit for creating a sealed digital envelope image by encrypting and combining the digital certificate created by a certificate server with the user select image stored in the image server unit; and the certificate server for registering a user using user personal information and a user identification code included in issuance application data of the user, and creating a digital certificate.

Preferably, the user terminal may request input of a digital envelope opening password and determines whether the inputted password is matched to a stored password through a digital envelope opening module, and a digital certificate extraction module may decrypt the digital envelope image and extract the digital certificate and the user select image only when the password is matched.

Also, preferably, the user terminal may be a cellular phone equipped with a SIM/USIM card, and the digital envelope opening password may be a phone number or serial number of the SIM/USIM card, International Mobile Equipment Identity (IMEI), a terminal manufacture number or a combination thereof.

To accomplish the above objects, according to a still further aspect of the present invention, there is provided a system for issuing a digital certificate using encrypted images, the system including: a user terminal comprising a digital envelope opening module and a digital certificate extracting module; a proxy server for confirming identity of a user and transmitting the identity to a certificate server in order to request to issue digital certificate; and the certificate server for creating a digital certificate and creating a sealed digital envelope image by encrypting and combining the created digital certificate with a user select image.

Preferably, the user terminal may request input of a digital envelope opening password and determines whether the inputted password is matched to a stored password through a digital envelope opening module, and a digital certificate extraction module may decrypt the digital envelope image and extract the digital certificate and the user select image only when the password is matched.

In addition, preferably, the user terminal may be a cellular phone equipped with a SIM/USIM card, and the digital envelope opening password may be a phone number or serial number of the SIM/USIM card, International Mobile Equipment Identity (IMEI), a terminal manufacture number or a combination thereof.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 8a and 8b are flowcharts illustrating a procedure of opening a digital envelope image according to the present invention;

DETAILED DESCRIPTION OF THE PREFERRED EMBODIMENT

Figure 1:
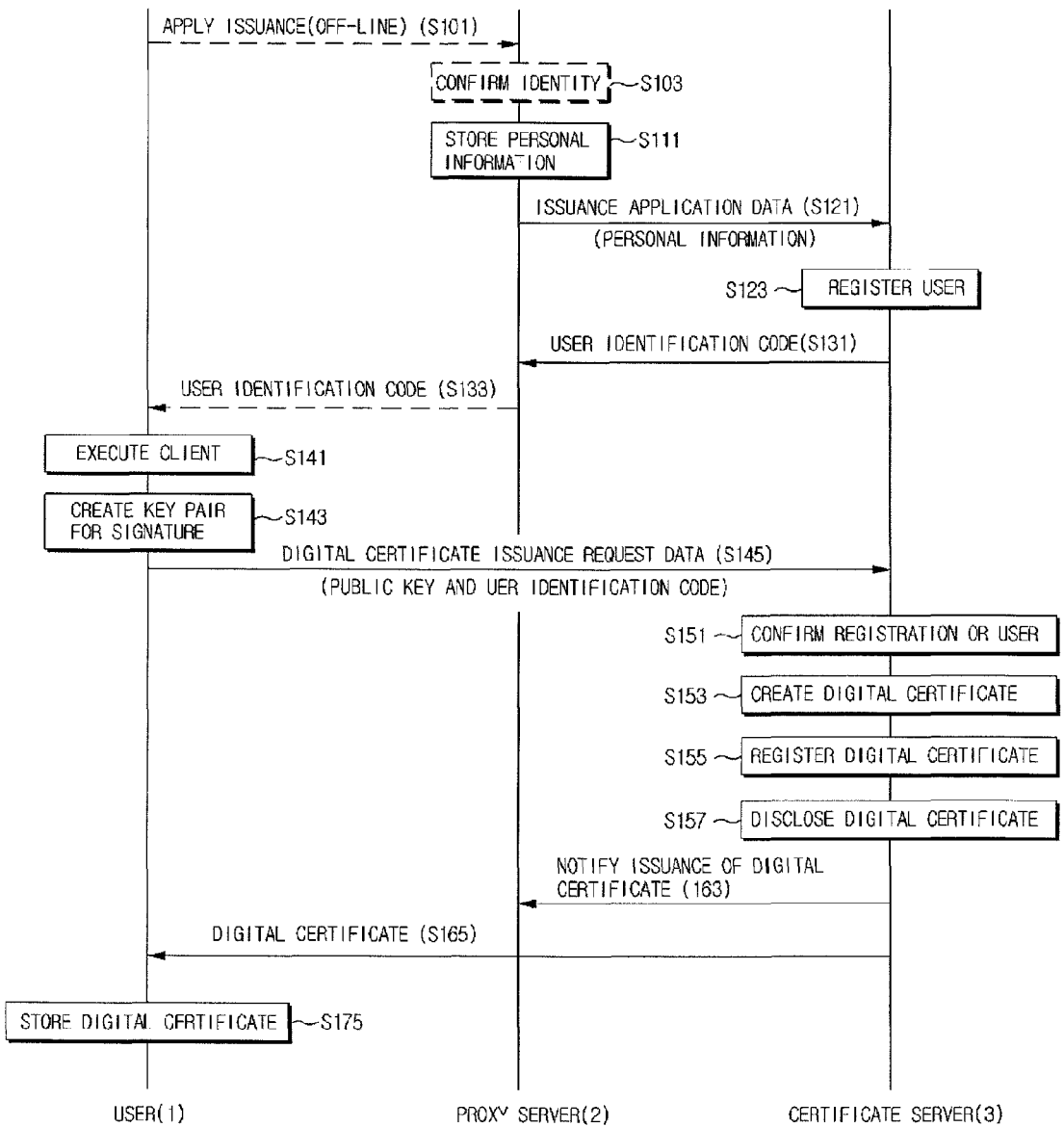
FIG. 1 is a flowchart illustrating a digital certificate issuing procedure of the prior art.
Figure 2:
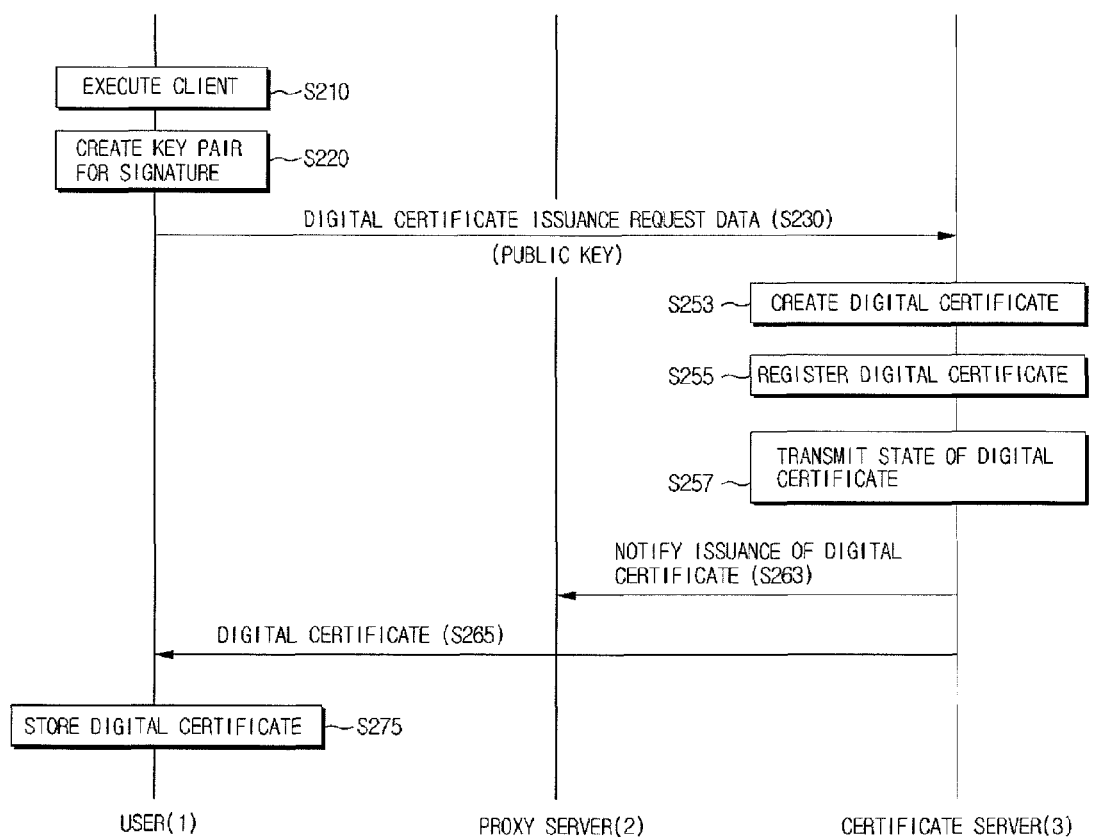
FIG. 2 is a flowcharts illustrating a digital certificate updating/re-issuing procedure of the prior art.

The preferred embodiments of a system and method for issuing a digital certificate using an encrypted image according to the present invention will be hereafter described in detail.

The features and advantages of the system and method for issuing a digital certificate using an encrypted image according to the present invention will be apparent from the detailed descriptions of the embodiments described below.

The embodiments below describe a method of issuing a digital certificate using an encrypted image based on a system for issuing a digital certificate, which is generally known on the filing date of this patent application. However, the present invention is not limited to thereto. Since core technical sprits of the present invention relate to sealing and transferring the digital certificate in an encrypted envelope and storing the transferred digital certificate in a sealed state in which it is combined with an encrypted image, the scope of the present invention is not limited to the embodiments described below even if the method of issuing a digital certificate is changed of modified in the future.

Of course, it is to be understood that storing the transferred digital certificate in a sealed state in which it is combined with the encrypted image by a user falls within the scope of the present invention.

The present invention largely includes an embodiment in which a procedure of issuing, updating and re-issuing a digital certificate by registering and sealing a digital envelope image is performed in a proxy server and an embodiment in which a procedure of issuing, updating and re-issuing a digital certificate by registering and sealing a digital envelope image is performed in a certificate server.

In the following description, FIGS. 3a, 4a to 4d and 19a relate to the embodiment in which a procedure of issuing, updating and re-issuing a digital certificate by registering and sealing a digital envelope image is performed in a proxy server.

Also, FIGS. 3b, 5a to 5c and 19b relate to the embodiment in which a procedure of issuing, updating and re-issuing a digital certificate by registering and sealing a digital envelope image is performed in a certificate server.

Terminologies used herein to describe the present invention are as follows.

An "proxy server" can be defined as a server operated by an institution that can perform information inquiries and financial transactions using a digital certificate, such as an insurance company, a bank, a hospital and the like, and a "certificate server" can be defined as a server operated by an institution who issues, registers and manages a digital certificate, such as Korea Financial Telecommunications and Clearings Institute.

Of course, it is to be understood that both of the servers can be ones operated by other institutions.

A "digital certificate" includes all sorts of digital means enabling user authentication in the process of an information inquiry, financial transaction, electronic commerce transaction and the like through an institution operating a proxy server.

A "user select image (img_select)" refers to an image used for digitally sealing a digital certificate (includes both of an image selected by a user and an image designated by a proxy server).

A "digital envelope image (img_envelope)" is an image sealed by combing a digital certificate with a user select image, which apparently looks like a user select image.

A "digital envelope opening password (cipher_open)" is inputted in the step of opening a sealing of a digital envelope image, which is used to extract a digital certificate by separating a digital envelope image into a digital certificate and a user select image.

In addition, a "client" generally refers to software provided to a lower server or a user terminal by a server, which is a program allowing a user to acquire a digital certificate, create a sealed digital envelope image and transmit a user select image.

Figure 3A:
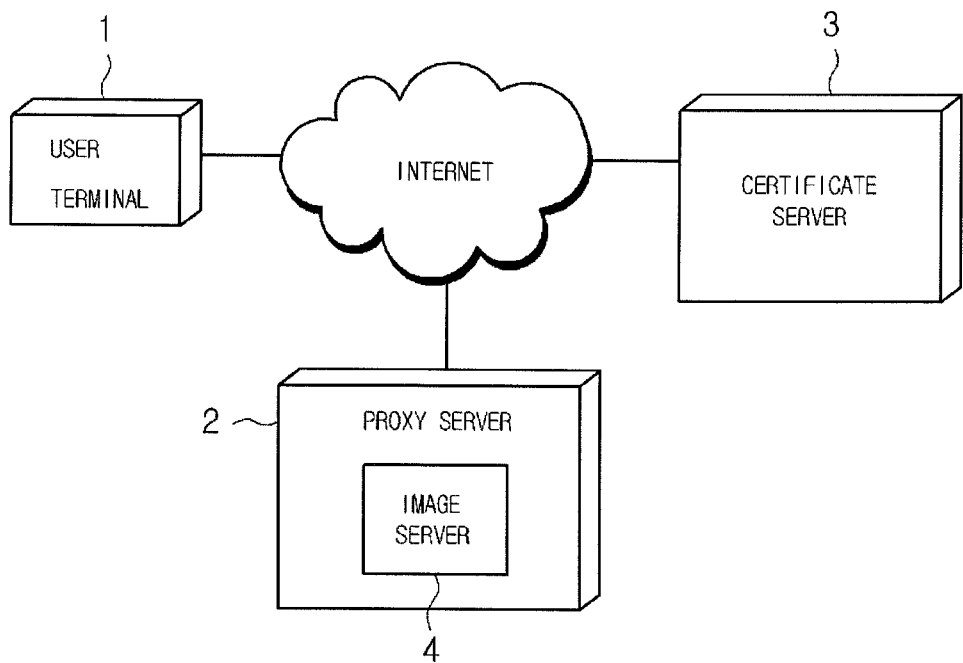
FIG. 3a is a block diagram showing the configuration of a system for issuing a digital certificate using an encrypted image operating in a proxy server.
Figure 3B:
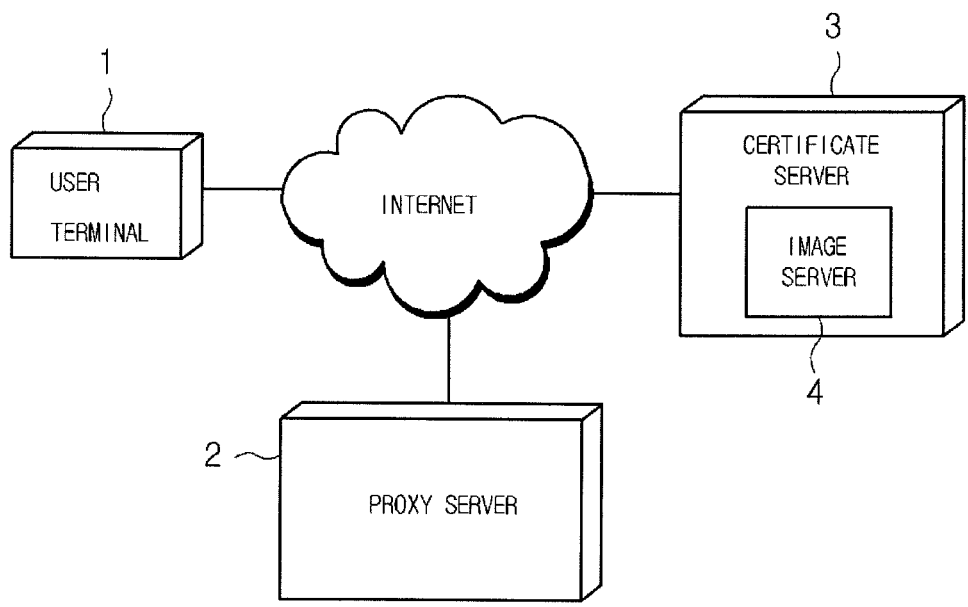
FIG. 3b is a block diagram showing the configuration of a system for issuing a digital certificate using an encrypted image operating in a certificate server.

FIG. 3a is a block diagram showing the configuration of a system for issuing a digital certificate using an encrypted image operating in a proxy server, and FIG. 3b is a block diagram showing the configuration of a system for issuing a digital certificate using an encrypted image operating in a certificate server.

The system for issuing a digital certificate using an encrypted image according to the present invention comprises a user terminal 1, a proxy server 2 and a certificate server 3, and such a configuration is different from a digital certificate issuing system of the prior art in the internal configuration.

Here, the certificate server 3 is connected to or includes a directory server that discloses the public key of a digital certificate and an online certificate status protocol (OCSP) server that discloses information on the state of a digital certificate such as issuance, abolition and suspension of the digital certificate, or functions of the servers can be implemented within the certificate server 3.

That is, since the servers can be implemented as an independent server or included only in the certificate server 3 in some cases, it cannot be said that only either of them is a correct configuration, but both of the configurations are within the scope of the present invention.

In the case of FIG. 3a, the proxy server 2 includes an image server 4 in order to register and store the user select image (img_select) and the digital envelope image.

Of course, it is to be understood that the image server 4 can be independently configured, not as a lower part of the proxy server 2.

In the case of FIG. 3b, the certificate server 3 includes the image server 4 in order to register and store the user select image (img_select) and the digital envelope image.

Of course, it is to be understood that the image server 4 can be independently configured, not as a lower part of the certificate server 3.

A digital certificate issuing procedure using an encrypted image of the digital certificate issuing system having such a configuration will be described below.

First, a digital certificate issuing procedure using an encrypted image operating in a proxy server will be described with reference to FIGS. 4a to 4d.

Figure 4A:
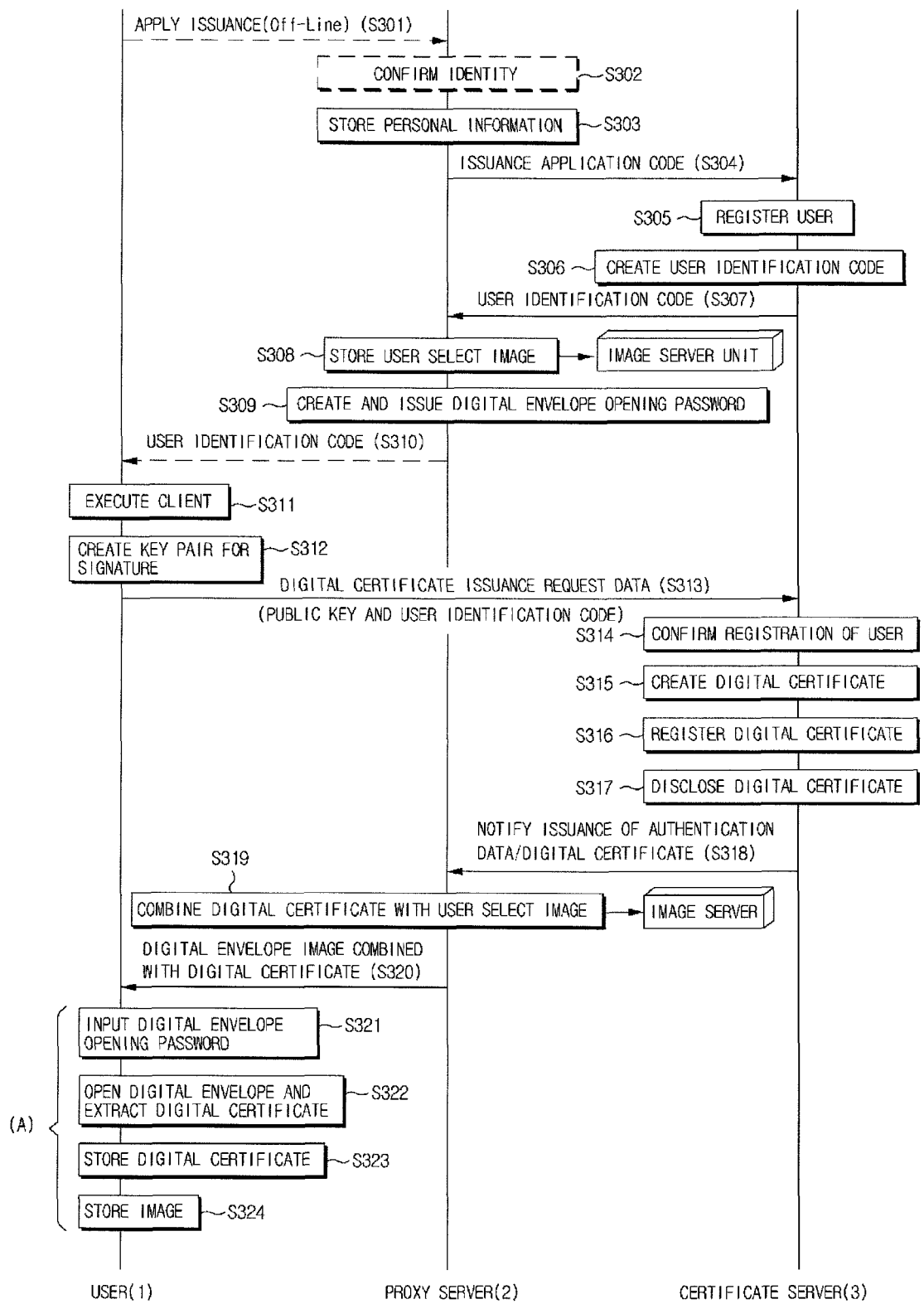
FIGS. 4a to 4d are flowcharts illustrating a digital certificate issuing, updating and re-issuing procedure using an encrypted image in a proxy server.

FIG. 4a a flow diagram illustrating a configuration where a digital envelope opening password (cipher_open) is created in the proxy server 2 and notified to the user when a digital certificate is issued, and a sealing procedure that combines the digital certificate with a user select image is performed in the proxy server 2.

Of course, it is to be understood that a user can specify a digital envelope opening password (cipher_open) when the user applies for issuance of a digital certificate.

In FIG. 4a, those expressed as a dotted line are implemented off-line.

First, a user who desires issuance of a digital certificate submits an issuance application form filled with personal information (info_personal) to a certificate agency (a financial institution, government office or the like) together with documents for proving identity of the user such as an identification card or the like (S301). In response, the certificate agency confirms identity of the user based on the documents for confirming identity of the applicant (S302).

After the identity is confirmed, the personal information (info_personal) filled in the application form is stored in the proxy server 2 through a terminal of the certificate agency (S303).

Then, issuance application data (data_application) including the personal information (info_personal) of the user stored in the proxy server 2 is transferred to the certificate server 3 (S304).

The certificate server 3 receiving the issuance application data (data_application) registers the user of the digital certificate (S305). In registering the user, additional information needed for using a financial or public institution (an account number, address, phone number and the like) is included in addition to the name and resident registration number of the user.

Thereafter, the certificate server 3 creates a user identification code (code_identify) such as a reference number/authentication code or the like (S306).

The reference number is a 7-digit number, and the authentication code a 20-digit code. It is possible to confirm whether the user is registered and the same as the applicant by requesting the codes when the user requests issuance of the digital certificate. However, since the reference number/authentication code can be replaced with another component as the technology is advanced, the reference number/authentication code can be expressed in a higher concept that is referred to as a user identification code (code_identify).

The user identification code (code_identify) created as such is transmitted to the proxy server 2 (S307).

Then, the proxy server 2 stores the user select image (img_select) selected by the user into a server unit (S308), and creates and issues a digital envelope opening password (cipher_open) (S309).

Here, instead of creating a digital envelope opening password (cipher_open), it is also possible to perform a procedure of registering biological information, such as user's face image template information, fingerprints, irises and the like, in order to open the digital envelope by confirming the biological information.

Of course, it is also possible to simultaneously perform a procedure of creating a digital envelope opening password (cipher_open) and a procedure of registering biological information.

If the procedure required for issuing the digital certificate is completed, the certificate agency issues a user identification code (code_identify) to the user by delivering a guidebook or the like (S310).

The user who completes the application procedure through the delivery of the guidebook executes a client through the user terminal and requests the certificate server 3 to issue a digital certificate.

First, the user executes the client (S311).

The user terminal where the client is executed creates a signature key configured with a public and private key pair (S312).

Thereafter, the user terminal transmits digital certificate issuance request data (data_request) including the public key and the user identification code to the certificate server 3 (S313).

Since execution of the client and transmission of the digital certificate issuance request data (data_request) are apparent to those skilled in the art, detailed descriptions thereof will be omitted to avoid redundancy.

The certificate server 3 receiving the digital certificate issuance request data (data_request) confirms whether the user requesting issuance of the digital certificate is identical to a person registered in the server as a user. The certificate server 3 can determine the identicalness based on the user identification code (code_identify) such as the reference number, authentication code or the like received from the user terminal 1 (S314).

Here, if the biological information is registered, the step of confirming the biological information can be included in the step of confirming whether the user requesting issuance of the digital certificate is identical to a person registered in the server as a user. After confirming whether the user is registered, the certificate server 3 creates a digital certificate using the public key received from the user terminal 1 (S315) registers the created digital certificate (S316) and discloses the digital certificate (S317).

Since these steps are also apparent to those skilled in the art, detailed descriptions thereof will be omitted.

As described above, the steps of creating, registering and disclosing the digital certificate are performed in the certificate server 3, and the certificate server 3 transmits authentication data and notifies issuance of the digital certificate to the proxy server 2 (S318).

The proxy server 2 creates a sealed digital envelope image (image_envelope) by encrypting and combining the created digital certificate with the user select image (img_select), and the digital envelope image (image_envelope) is stored in the image server 4 operated in cooperation with the proxy server 2 (S319).

The digital envelope image combined with the digital certificate like this is transmitted to the user (S320).

Transmission of the sealed digital envelope image goes through an authentication procedure using the user select image, and details of the authentication procedure will be described below with reference to FIGS. 8a and 8b.

If the digital envelope image combined with the digital certificate is transmitted to the user like this, the user may separate and store the digital certificate and the digital envelope image and use the digital certificate when the digital certificate is needed as shown in FIG. 4a (A).

That is, if the digital envelope image combined with the digital certificate is transferred to the user, the user inputs a digital envelope opening password (S312) and extracts the digital certificate by opening the digital envelope (S322). Then, the digital certificate and the digital envelope image are separately stored (S323 and S324).

As another method, the digital envelope image can be stored in a sealed state in which it is combined with the digital certificate unlike the method shown in FIG. 4a (A).

That is, it is possible to extract and use the digital certificate by inputting a digital envelope opening password whenever the certificate is needed and store the digital envelope image in a state combined with the digital certificate in order to fundamentally prevent the abuse of the digital certificate.

Details of storing the digital envelope image of a sealed state and storing the digital envelope image after extracting the digital certificate will be described below with reference to FIGS. 8a and 8b.

Hereinafter, a digital certificate issuing procedure of another embodiment will be described, in which since a user selects and seals a digital envelope image in person and backs up a backup copy of an encrypted image into a server of a certificate agency such as a bank, a hospital, an insurance company, a contents providing company and the like, the effect of preventing hacking attacks can be enhanced, and the stability and efficiency of the procedure for storing, updating and re-issuing the digital certificate can be enhanced.

Figure 4B:
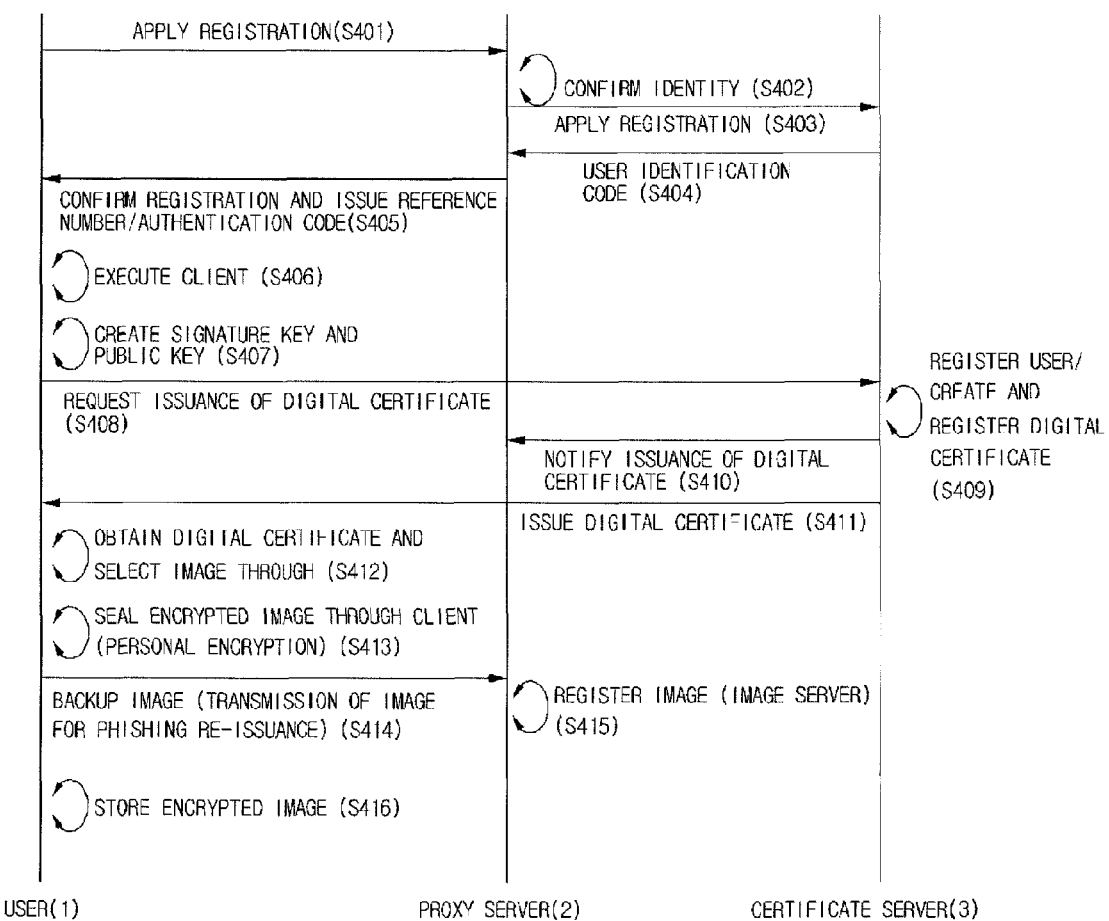

FIG. 4b is a flow diagram illustrating a configuration where a user performs a procedure for sealing and combining a digital certificate with a user select image.

First, a user who desires issuance of a digital certificate applies for registration by submitting an issuance application form filled with personal information (info_personal) to a certificate agency (a financial institution, government office or the like) together with documents for proving identity of the user such as an identification card or the like (S401). In response, the certificate agency confirms identity of the user based on the documents for confirming identity of the applicant (S402).

After the identity is confirmed, the personal information (info_personal) filled in the application form is stored in the proxy server 2 through a terminal of the certificate agency.

Then, the issuance application data (data_application) including the personal information (info_personal) of the user stored in the proxy server 2 is transferred to the certificate server 3 (S403).

Thereafter, the certificate server 3 creates a user identification code (code_identify) such as a reference number/authentication code or the like and transmits the user identification code to the proxy server 2 (S404).

The reference number is a 7-digit number, and the authentication code a 20-digit code. It is possible to confirm whether the user is registered and the same as the applicant by requesting the codes when the user requests issuance of the digital certificate. However, since the reference number/authentication code can be replaced with another component as the technology is advanced, the reference number/authentication code can be expressed in a higher concept that is referred to as a user identification code (code_identify).

Then, the proxy server 2 issues a reference number/authentication code to the user (S405), and the user executes a client (S406).

The user terminal where the client is executed creates a signature key configured with a public and private key pair (S407).

Thereafter, the user terminal transmits digital certificate issuance request data (data_request) including the public key and the user identification code to the certificate server 3 (S408).

Since execution of the client and transmission of the digital certificate issuance request data (data_request) are apparent to those skilled in the art, detailed descriptions thereof will be omitted.

The certificate server 3 receiving the digital certificate issuance request data registers the user of the digital certificate. In registering the user, additional information needed for using a financial or public institution (an account number, address, phone number and the like) is included in addition to the name and resident registration number of the user.

The certificate server 3 creates a digital certificate using the public key received from the user terminal 1, registers the created digital certificate (S316) and discloses the digital certificate (S409).

Since these steps are also apparent to those skilled in the art, detailed descriptions thereof will be omitted.

As described above, the steps of creating, registering and disclosing the digital certificate are performed in the certificate server 3, and the certificate server 3 transmits authentication data and notifies issuance of the digital certificate to the proxy server 2 (S410).

Then, the certificate server 3 issues a digital certificate to the user (S411), and the user acquires the digital certificate through the client and selects a user select image (S412).

The user creates a sealed digital envelope image (image_envelope) by encrypting and combining the digital certificate acquired through the client with the user select image (img_select) (S413).

The step of creating a digital envelope image (img_envelope) by the user includes the step of creating a digital envelope opening password (cipher_open).

Here, instead of creating a digital envelope opening password (cipher_open), it is also possible to perform a procedure of registering biological information, such as user's face image template information, fingerprints, irises and the like, in order to open the digital envelope by confirming the biological information.

Of course, it is also possible to simultaneously perform a procedure of creating a digital envelope opening password (cipher_open) and a procedure of registering biological information.

If the digital envelope image is created as described above, the user transmits a backup image to the proxy server 2 in order to protect the user from damages caused by hacking and phishing attacks and enhance the stability and efficiency of the re-issuing procedure (S414).

The user select image (img_select) backed up in the proxy server 2 is stored in an image server operated in cooperation with the proxy server 2 (S415).

The digital envelope image combined with the digital certificate as described above is stored in a sealed state.

Figure 4C:
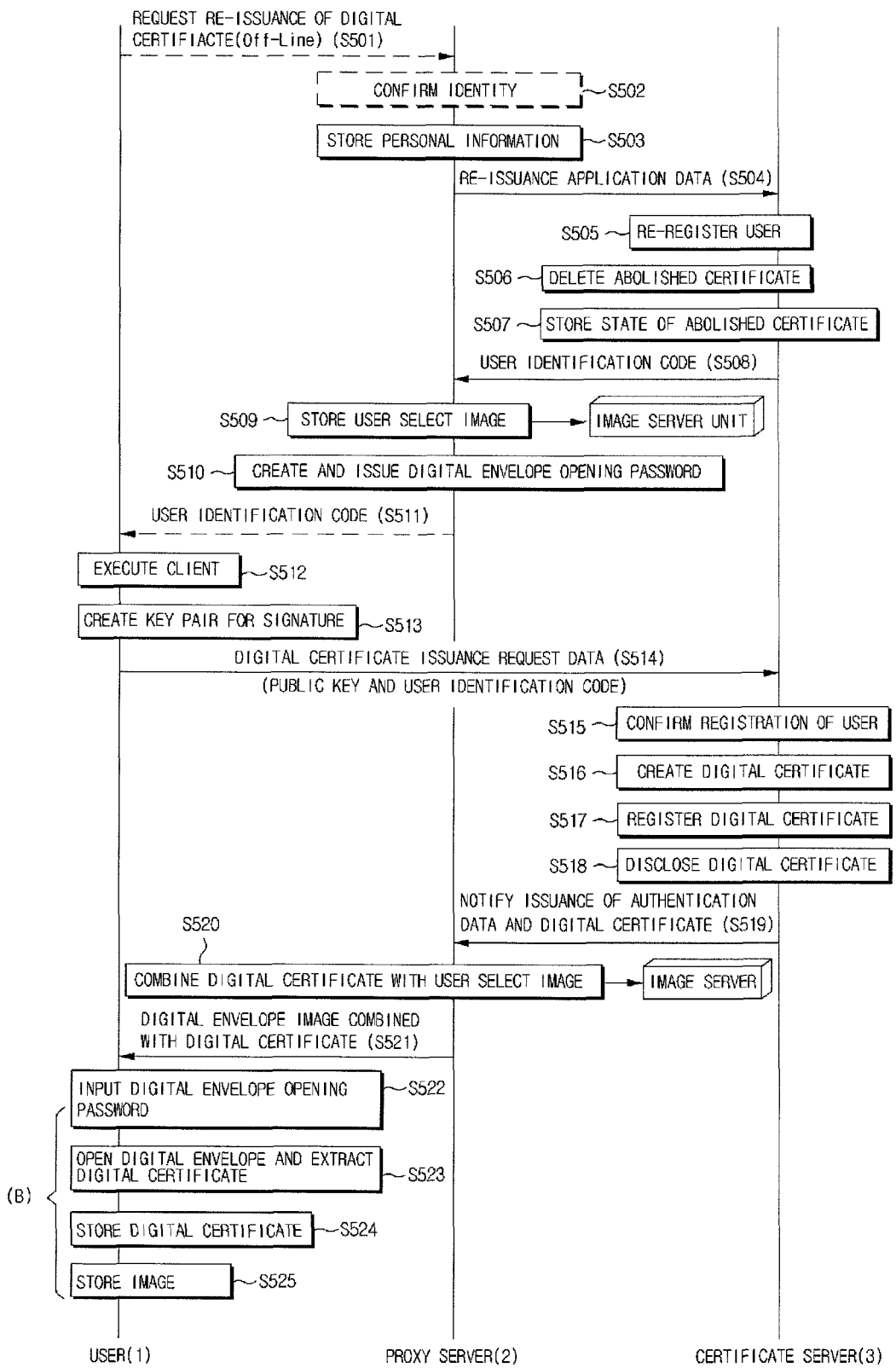
Figure 4D:
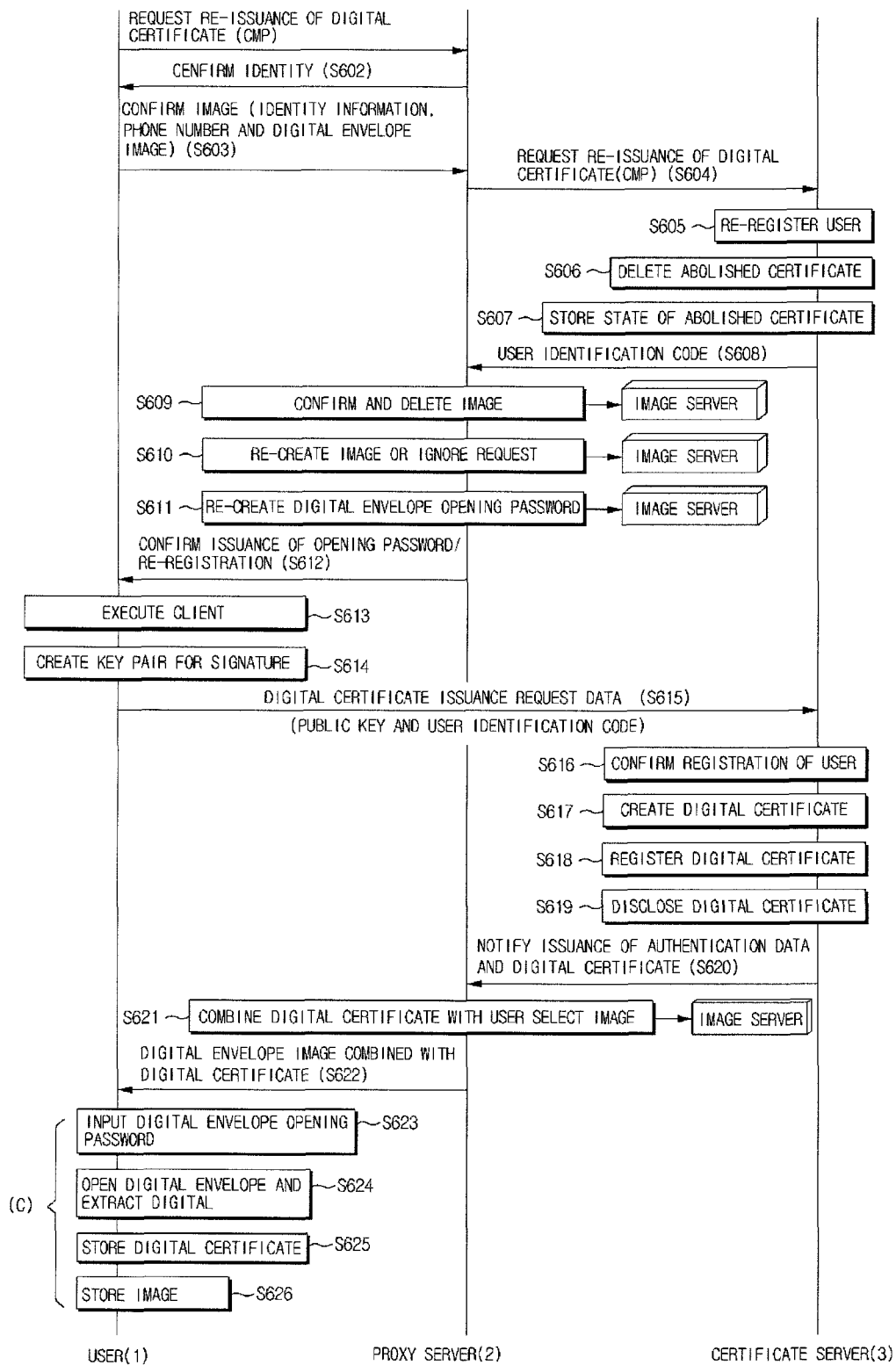

The digital envelope creating procedure of FIG. 4b described above enhances the effect of protecting the user from hacking attacks in a current certificate issuing system, and it is to be understood that the digital envelope creating procedure can be applied to the digital certificate updating and re-issuing procedure of FIGS. 4c and 4d shown below.

Hereinafter, a method of updating and re-issuing a digital certificate will be described.

FIG. 4c is a flow diagram illustrating a digital certificate updating and re-issuing procedure using an encrypted image according to the present invention.

FIG. 4d is a flow diagram illustrating a digital certificate updating and re-issuing procedure using an encrypted image according to another embodiment of the present invention.

First, a digital certificate updating and re-issuing procedure using an encrypted image performed off-line will be described with reference to FIG. 4c.

In FIG. 4c, those expressed as a dotted line are implemented off-line. First, a user who desires to update or issue a digital certificate submits an issuance application form filled with personal information (info_personal) to a certificate agency together with documents for proving identity of the user such as an identification card or the like (S501). In response, the certificate agency confirms identity of the user based on the documents for confirming identity of the applicant (S502).

It is to be understood that the confirmation using a user select image used in issuing a digital certificate by a user in the step of confirming identity can be utilized in the face-to-face registration procedure of the certificate agency.

After the identity is confirmed, the personal information (info_personal) filled in the application form is stored in the proxy server 2 through a terminal of the certificate agency (S503).

Then, issuance application data (data_application) including the personal information (info_personal) of the user stored in the proxy server 2 is transferred to the certificate server 3 (S504).

The certificate server 3 receiving the issuance application data (data_application) re-registers the user of the digital certificate (S305). In re-registering the user, additional information needed for using a financial or public institution (an account number, address, phone number and the like) is included, as well as the name and resident registration number of the user.

The certificate server 3 deletes a previously used and abolished digital certificate (S506) and stores a state of the abolished digital certificate (S507).

Thereafter, the certificate server 3 creates a user identification code (code_identify) such as a reference number/authentication code or the like and transmits the user identification code to the proxy server 2 (S508).

The proxy server 2 stores the user select image (img_select) re-selected by the user into the image server (S509), and creates and issues a digital envelope opening password (cipher_open) for updating or re-issuing the digital certificate (S510).

Here, instead of creating a digital envelope opening password (cipher_open), it is also possible to perform a procedure of registering biological information, such as fingerprints, irises and the like, in order to open the digital envelope by confirming the biological information.

Of course, it is also possible to simultaneously perform a procedure of creating a digital envelope opening password (cipher_open) and a procedure of registering biological information.

If the procedure required for updating or re-issuing the digital certificate is completed, the certificate agency issues a user identification code (code_identify) to the user by delivering a guidebook or the like (S511).

The user who completes the application procedure through the delivery of the guidebook executes a client through the user terminal and requests the certificate server 3 to update or re-issue a digital certificate.

First, the user executes the client (S512).

The user terminal where the client is executed creates a signature key configured with a public and private key pair (S513).

Thereafter, the user terminal transmits digital certificate issuance request data (data_request) including the public key and the user identification code to the certificate server (S514).

The certificate server 3 receiving the digital certificate issuance request data (data_request) confirms whether the user requesting issuance of the digital certificate is identical to a person registered in the server as a user. The certificate server 3 can determine the identicalness based on the user identification code (code_identify) such as the reference number, authentication code and the like received from the user terminal 1 (S515).

Here, if the biological information is registered, the step of confirming the biological information can be included in the step of confirming whether the user requesting issuance of the digital certificate is identical to a person registered in the server as a user.

After confirming whether the user is registered, the certificate server 3 creates a digital certificate using the public key received from the user terminal 1 (S516), registers the created digital certificate (S517) and discloses the digital certificate (S518).

As described above, the steps of creating, registering and disclosing the digital certificate are performed in the certificate server 3, and the certificate server 3 transmits authentication data and notifies issuance of the digital certificate to the proxy server 2 (S519).

The proxy server 2 creates a sealed digital envelope image (image_envelope) by encrypting and combining the created digital certificate with the user select image (img_select), and the digital envelope image (image_envelope) is stored in an image server 4 operated in cooperation with the proxy server 2 (S520).

The digital envelope image combined with the digital certificate like this is transmitted to the user (S521).

An authentication procedure is performed using a user select image before the sealed digital envelope image is transmitted to the user terminal, and details of the authentication procedure is the same as described above with reference to FIGS. 8a and 8b.

If the digital envelope image combined with the digital certificate is transmitted to the user like this, the user may separate and store the digital certificate and the digital envelope image and use the digital certificate when the digital certificate is needed as shown in FIG. 4c (B).

That is, if the digital envelope image combined with the digital certificate is transferred to the user, the user inputs a digital envelope opening password (S522) and extracts the digital certificate by opening the digital envelope (S523). Then, the digital certificate and the digital envelope image are separately stored (S524 and S525).

As another method, the digital envelope image can be stored in a state of being combined with the digital certificate unlike the method as shown in FIG. 4c (B).

That is, as shown in FIG. 8b, it is possible to extract and use the digital certificate by inputting a digital envelope opening password whenever the certificate is needed and store the digital envelope image in a state combined with the digital certificate in order to fundamentally prevent the abuse of the digital certificate.

In the digital certificate updating and re-issuing procedure described above, re-issuance is applied offline, and the proxy server can store the user select image, create and issue a digital envelope opening password and combine the digital certificate with the user select image.

Next, a digital certificate updating and re-issuing procedure using an encrypted image performed on-line will be described with reference to FIG. 4d.

In order to update or re-issue a digital certificate on-line, a user executes a client in the user terminal 1 and transmits a digital certificate updating or re-issuing request (CMP) (S601).

Here, a user select image can be included in the digital certificate updating or re-issuing request (CMP) data as a criterion for determining whether the user select image is identical to an image registered in the image server by the user.

The proxy server 2 receiving the digital certificate updating or re-issuing request (CMP) confirms identity of the user on-line through the identification information, phone number and digital envelope image (S602).

As another method, if biological information is registered when the digital certificate is initially requested, identity of the user can be confirmed using the biological information.

If the user is determined to be valid through the user confirmation step (S603), the proxy server 2 transmits a digital certificate updating or re-issuing request (CMP) to the certificate server 3 (S604).

The certificate server 3 deletes a previously used and abolished digital certificate (S605) and stores the state of the abolished digital certificate (S606).

Thereafter, the certificate server 3 creates a user identification code (code_identify) such as a reference number/authentication code or the like and transmits the user identification code to the proxy server 2 (S608).

Then, the proxy server 2 confirms and deletes the previous user select image (S609).

The proxy server 2 stores the user select image (img_select) re-selected by the user into the image server (S509), and creates and issues a digital envelope opening password (cipher_open) for updating or re-issuing the digital certificate (S611).

Here, the user select image (img_select) can be used as is used before or re-selected.

If the procedure needed for updating or re-issuing the digital certificate is completed, the certificate agency confirms issuance and re-registration of the digital envelope opening password through the user terminal 1.

The user who confirmed the issuance and re-registration of the digital envelope opening password executes a client through the user terminal 1 and requests the certificate server 3 to issue a digital certificate.

First, the user executes the client (S613).

The user terminal where the client is executed creates a signature key configured with a public and private key pair (S614).

Thereafter, the user terminal transmits digital certificate issuance request data (data_request) including the public key and the user identification code to the certificate server (S615).

The certificate server 3 receiving the digital certificate issuance request data (data_request) confirms whether the user requesting issuance of the digital certificate is identical to a person registered in the server as a user. The certificate server 3 can determine the identicalness based on the user identification code (code_identify) such as the reference number, authentication code or the like received from the user terminal 1 (S616).

Here, if the biological information is registered, the step of confirming the biological information can be included in the step of confirming whether the user requesting issuance of the digital certificate is identical to a person registered in the server as a user.

After confirming whether the user is registered, the certificate server 3 creates a digital certificate using the public key received from the user terminal 1 (S617), registers the created digital certificate (S618) and discloses the digital certificate (S619).

As described above, the steps of creating, registering and disclosing the digital certificate are performed in the certificate server 3, and the certificate server 3 transmits authentication data and notifies issuance of the digital certificate to the proxy server 2 (S620).

The proxy server 2 creates a digital envelope image (image_envelope) by encrypting and combining the created digital certificate with the user select image (img_select), and the digital envelope image (image_envelope) is stored in the image server operated in cooperation with the proxy server 2 (S621).

The digital envelope image combined and sealed with the digital certificate like this is transmitted to the user (S622).

Here, an authentication procedure is performed using the user select image before the sealed digital envelope image is transmitted to the user terminal, and details of the authentication procedure is the same as described above with reference to FIGS. 8a and 8b.

If the digital envelope image combined with the digital certificate is transmitted to the user like this, the user may separate and store the digital certificate and the digital envelope image and use the digital certificate when the digital certificate is needed as shown in FIG. 4d (C).

That is, if the digital envelope image combined with the digital certificate is transferred to the user, the user inputs a digital envelope opening password (S623) and extracts the digital certificate by opening the digital envelope (S624).

Then, the digital certificate and the digital envelope image are separately stored (S625 and S626).

Here, if the user does not select a new user select image in the step of requesting re-issuance of the digital certificate, the step of storing the image can be omitted.

As another method, the digital envelope image can be stores in a sealed state in which it is combined with the digital certificate unlike the method shown in FIG. 4d (C).

That is, as shown in FIG. 8b, it is possible to extract and use the digital certificate by inputting a digital envelope opening password whenever the certificate is needed and store the digital envelope image in a state combined with the digital certificate in order to fundamentally prevent the abuse of the digital certificate.

Even if a digital certificate is updated or re-issued in this method, a user can update or re-issue the digital certificate only through an on-line connection without visiting a certificate authority or certificate agency, and thus convenience of a digital certificate user can be achieved.

That is, off-line confirmation of user identity is absolutely necessary since there is a credibility problem in confirming the user identity when a digital certificate is updated or re-issued. However, according to the present invention, a digital envelope utilizing an image that is hard to hack can be used to perform an updating/re-issuing procedure through an on-line connection.

So far, it has been described that a certificate agency issues a digital envelope opening password, confirms registration of the digital envelope opening password and creates a digital envelope image (img_envelope) by combining a digital certificate with a user select image (img_select).

The method of performing a procedure related to the digital envelope image (image_envelope) by the certificate agency like this is not limited to the embodiments described above, but it is to be understood that the method of performing a procedure related to the digital envelope image can be applied to a method of issuing a private digital certificate using an encrypted image in a system comprising a user terminal, a contents provider (CP) server and a private certificate server.

That is, currently, a log-in procedure using digital certificate is employed in order to solve the problems caused by theft of resident registration numbers, and contents providers (CP) employing the log-in procedure using a digital certificate can confirm identity of a user with the same effect as that of using a digital certificate through a private certificate company.

It is configured such that a proxy server in issuing a digital certificate corresponds to a CP server in issuing a private digital certificate, and a certificate server in issuing a digital certificate corresponds to a private certificate server.

However, in issuing a private digital certificate, identity of a user needs to be confirmed not so strictly as in issuing a digital certificate. Therefore, identity of a user is confirmed by using a method such as a cellular phone, an e-mail or the like rather than by visiting the company off-line.

That is, after transmitting an authentication number (num identity) using a cellular phone or an e-mail of the user in order to confirm identity of the use, the private certificate server requests input of an authentication number (num identity) and confirms identity of the user by determining whether the authentication numbers correspond to each other.

The subsequent procedure is the same as that shown in FIGS. 4a to 4d, and it is possible to transmit a user identification code (code_identify) such as a digital envelope opening password (cipher_open) and a user serial number (num serial) through a wired or wireless communication means such as an e-mail, cellular phone SMS or the like.

First, a procedure of issuing, updating and re-issuing a digital certificate performed in a proxy server using an encrypted image will be described below with reference to FIGS. 5a to 5c.

Figure 5A:
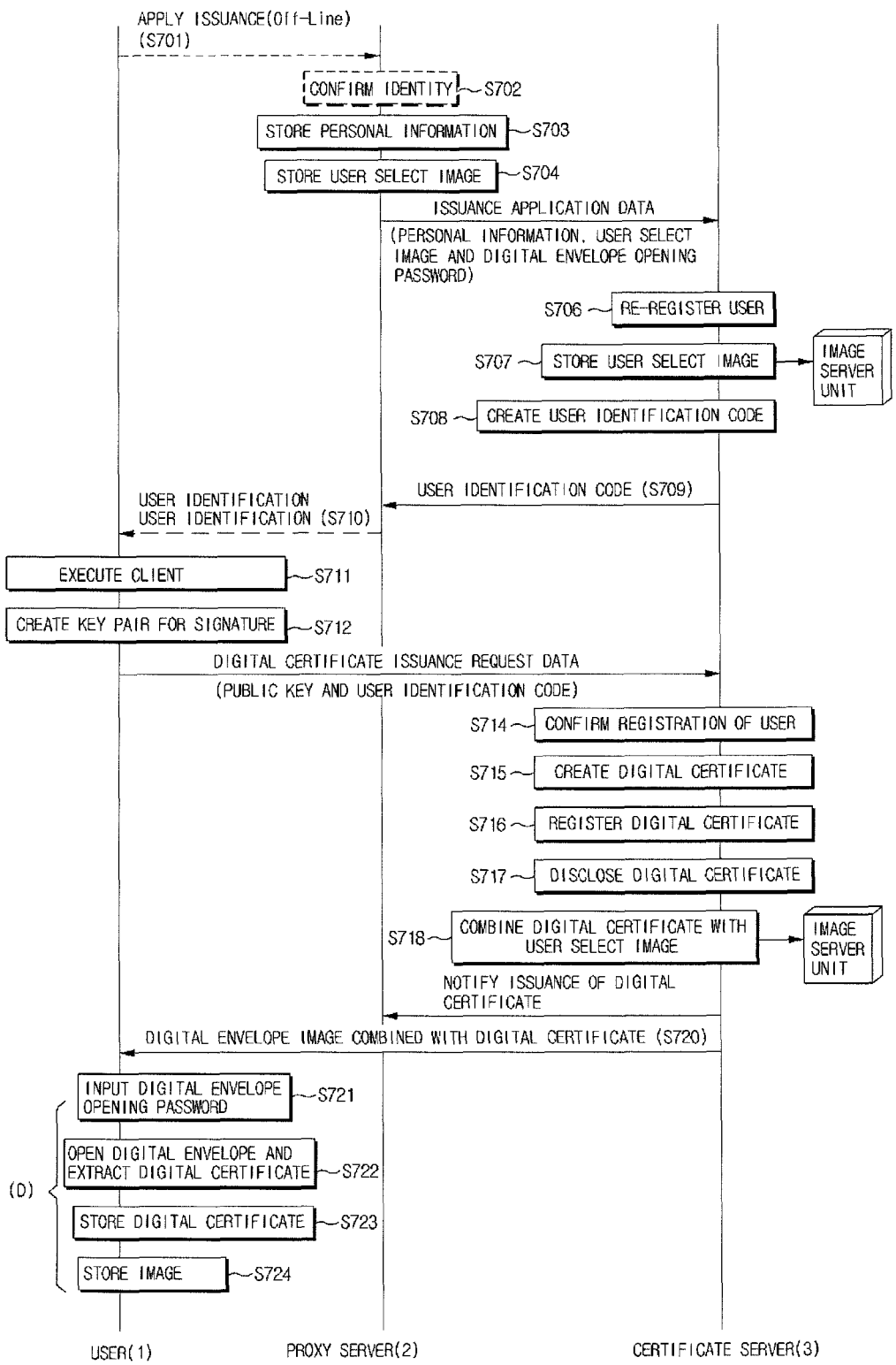
FIGS. 5a to 5c are flowcharts illustrating a digital certificate issuing, updating and re-issuing procedure using an encrypted image in a certificate server.
Figure 5B:
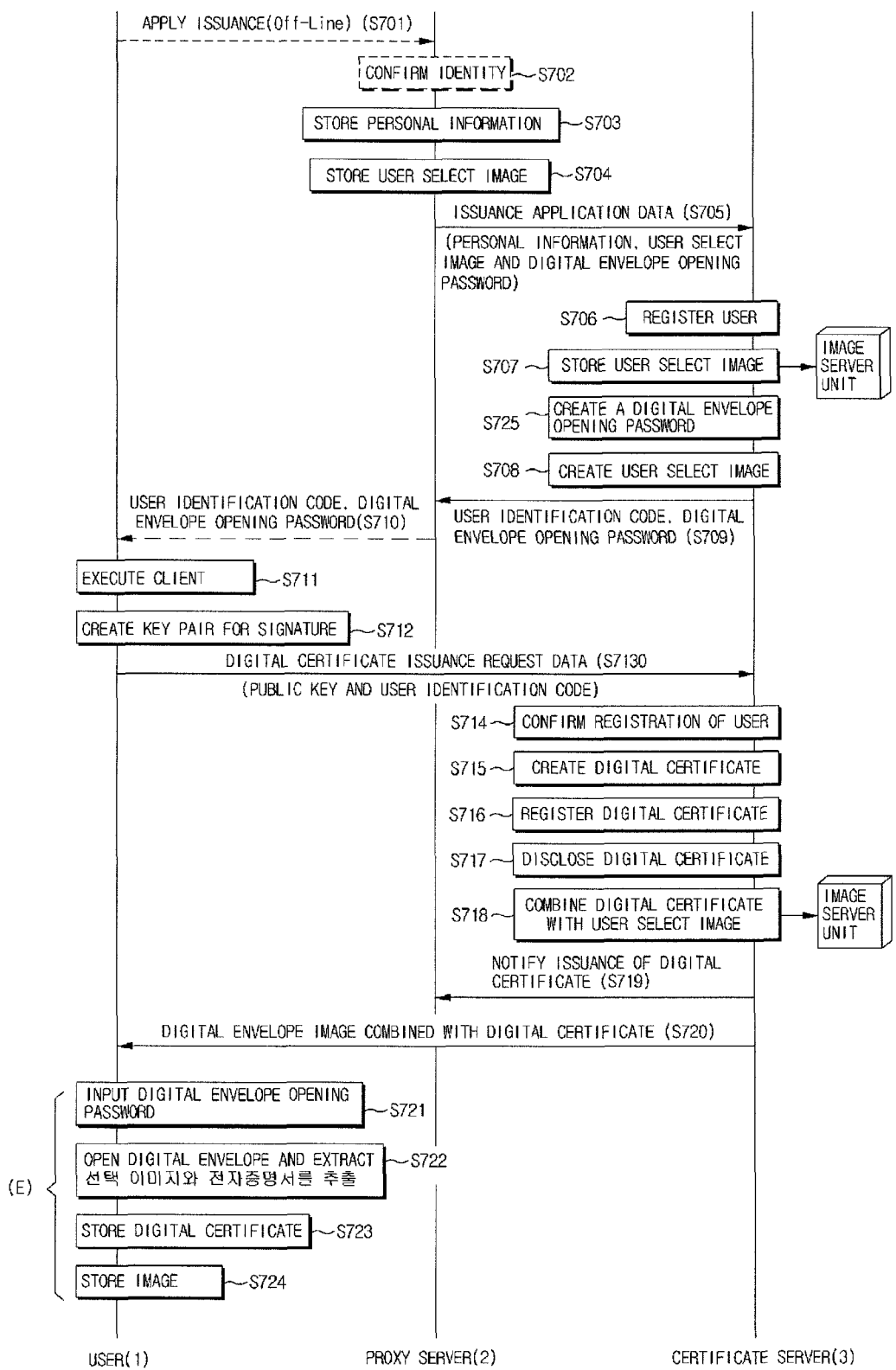

FIG. 5a is a flow diagram illustrating a configuration where a user specifies a digital envelope opening password (cipher_open) when the user applies for a digital certificate, and FIG. 5b is a flow diagram illustrating a configuration where the certificate server 3 creates a digital envelope opening password (cipher_open) and notifies the digital envelope opening password to the user.

In FIG. 5a, the steps indicated by a dotted line are implemented off-line.

First, a user who desires to issue a digital certificate submits an issuance application form (including a digital envelope opening password (cipher_open)) filled with personal information (info_personal) to a certificate agency (a financial institution, government office or the like) together with documents for proving identity of the user (S701).

The certificate agency confirms identity of the user based on the documents for confirming identity of the applicant (S702).

After the identity is confirmed, the personal information (info_personal) filled in the application form is stored in the proxy server 2 through a terminal of the certificate agency (S703), and a user select image (img_select) is stored together with the personal information (S704).

At this point, the digital envelope opening password (cipher_open) is also stored in the proxy server 2. The issuance application data (data_application) including the personal information (info_personal) of the user, the user select image (img_select) and the digital envelope opening password (cipher_open) stored in the proxy server 2 is transferred to the certificate server 3 (S705).

The certificate server 3 receiving the issuance application data (data_application) registers the user of the digital certificate (S706).

In registering the user, additional information needed for using a financial or public institution (an account number, address, phone number and the like) is included in addition to the name and resident registration number of the user.

In addition, the certificate server 3 transmits the user select image (img_select) to the image server 4, and the image server 4 stores the user select image (img_select) (S707).

Thereafter, the certificate server 3 creates a user identification code (code_identify) such as a reference number/authentication code or the like (708).

The reference number is a 7-digit number, and the authentication code a 20-digit code. It is possible to confirm whether the user is registered and the same as the applicant by requesting the codes when the user requests issuance of the digital certificate. However, since the reference number/authentication code can be replaced with another component as the technology is advanced, the reference number/authentication code can be expressed in a higher concept that is referred to as a user identification code (code_identify).

The created user identification code (code_identify) is transmitted to the proxy server 2 (S709) and the proxy server 2 issues a user identification code to the user by delivering a guidebook or the like (S710).

The user who completes the application procedure through the delivery of the guidebook executes an authentication plug-in through the user terminal and requests the certificate server 3 to issue a digital certificate.

First, the user executes the client (S711). The user terminal where the client is executed creates a signature key configured with a public and private key pair (S712).

Next, the user terminal transmits digital certificate issuance request data (data_request) including the public key and the user identification code to the certificate server (S713).

The certificate server 3 receiving the digital certificate issuance request data (data_request) confirms whether the user requesting issuance of the digital certificate is identical to a person registered in the server as a user. The certificate server 3 can determine the identicalness based on the user identification code (code_identify) received from the user terminal 1, such as the reference number, authentication code or the like (S714).

After confirming whether the user is registered, the certificate server 3 creates a digital certificate using the public key received from the user terminal 1 (S715), registers the created digital certificate (S716) and discloses the digital certificate (S717).

Then, after performing the steps of creating, registering and disclosing a digital certificate, the certificate server 3 should transmit the digital certificate to the user. In transmitting a digital certificate, a method of transmitting the digital certificate using an encrypted image is an important feature of the present invention, and this will be described below.

The certificate server 3 creates a digital envelope image (image_envelope) by encrypting and combining the created digital certificate with the user select image (img_select) (S718).

A sealing and extracting procedure accomplished by combining the digital certificate and the user select image (img_select) will be described below with reference to FIGS. 6 and 7.

The digital envelope image (img_envelope) created in the certificate server 3 by sealing the digital certificate in the digital envelope image (img_envelope) is stored in the image server 4 connected to the certificate server 3.

The certificate server 3 notifies issuance of the digital certificate to the proxy server 2 before transferring the digital certificate to the user (S719).

Then, the certificate server 3 transmits the digital envelope image (img_envelope) to the user terminal 1 (S720).

The user terminal 1 receiving the digital envelope image (img_envelope) goes through the steps of inputting a digital envelope opening password (cipher_open) (S721) and extracting the digital certificate by opening the digital envelope (S722), and opening the digital envelope will be described below in detail with reference to FIGS. 8*a* and 8*b*.

The digital certificate and the user select image as extracted above (S723) are stored (S724).

FIG. 5*a* is a flow diagram illustrating a case where a user specifies a digital envelope opening password (cipher_open) when the user applies for a digital certificate.

In FIG. 5*b*, it is not that a user specifies a digital envelope opening password (cipher_open), but that a certificate authority creates a digital envelope opening password (cipher_open).

The overall flow is the same as shown in FIG. 5*a*, except only the step of creating a digital envelope opening password (cipher_open) (S725).

Figure 5C:
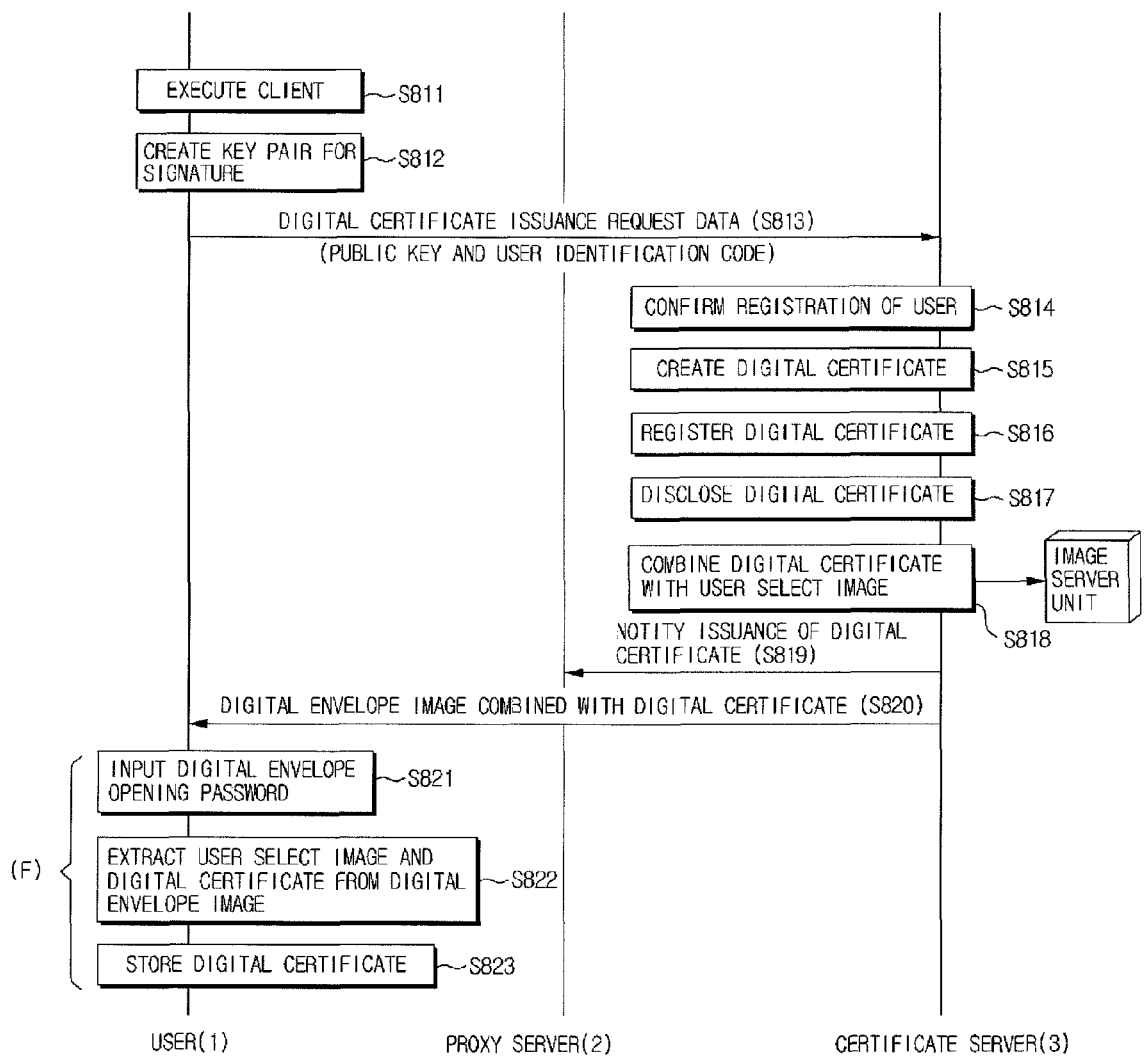

FIG. 5*c* is a flow diagram illustrating a digital certificate updating and re-issuing procedure using the certificate server, in which the user executes a client in the user terminal 1 and selects an update or re-issue command in order to update or re-issue the digital certificate (S811).

Accordingly, the user terminal 1 where the client is executed creates a signature key configured with a public and private key pair (S812) and transmits digital certificate update/re-issuance request data to the certificate server 3 (S813).

The digital certificate update/re-issuance request data includes a user select image (img_select) in addition to the public key.

The certificate server 3 receiving the digital certificate update/re-issuance request data confirms whether the user requesting update/re-issuance of the digital certificate is identical to a person registered in the server as a user.

This can be determined based on whether the user select image (img_select) included in the digital certificate update/re-issuance request data is identical to an image registered in the image server 4 by the user (S814).

After confirming whether the user is registered, the certificate server creates a digital certificate using the public key received from the user terminal 1 S815, registers the created digital certificate (S816) and discloses a state of the digital certificate (S817).

Then, the certificate server 3 creates a digital envelope image (image_envelope) by encrypting and combining the created digital certificate with the user select image (img_select) (S818).

A sealing and extracting procedure accomplished by combining the digital certificate and the user select image (img_select) will be described below with reference to FIGS. 6 and 7.

The digital envelope image (img_envelope) created in the certificate server 3 by sealing the digital certificate in the digital envelope image (img_envelope) is stored in the image server 4 connected to the certificate server 3.

The certificate server 3 notifies issuance of the digital certificate to the proxy server 2 before transferring the digital certificate to the user (S819).

Then, the certificate server 3 transmits the digital envelope image (img_envelope) to the user terminal 1 (S820).

The user terminal 1 receiving the digital envelope image (img_envelope) goes through the steps of inputting a digital envelope opening password (cipher_open) (S821) and extracting the digital certificate by opening the digital envelope (S822), and opening the digital envelope will be described below in detail with reference to FIGS. 8a and 8b.

The digital certificate extracted as such is stored (S823).

Even if a digital certificate is updated or re-issued in this method, a user can update or re-issue the digital certificate only through an on-line connection without visiting a certificate authority or certificate agency, and thus convenience of a digital certificate user can be achieved.

Transmitting a digital certificate using an encrypted image and storing the transmitted digital certificate in issuing and transmitting the digital certificate are an important feature of the present invention, and this will be described below.

Figure 6:
FIG. 6 is a view showing the concept of sealing a digital envelope image according to the present invention.
Figure 7:
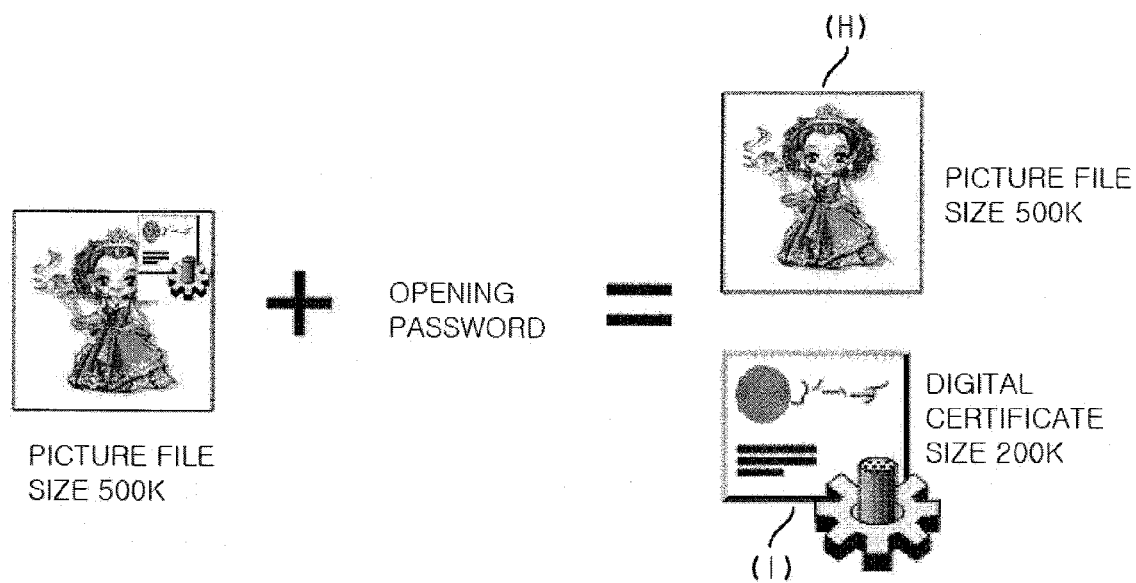
FIG. 7 is a view showing the concept of opening a digital envelope according to the present invention.

FIGS. 6 and 7 are views briefly showing a sealing and extracting procedure accomplished by combining the digital certificate with the user select image (img_select).

As shown in FIG. 6, a digital envelope image can be created by embedding a digital certificate into a user select image (img_select) (this is expressed as a term referred to as sealing) and then setting a password for opening the envelope (this means extracting the user select image (img_select) and the digital certificate from the digital envelope image (img_envelope)).

FIG. 7 relates to opening a sealed digital envelope image. If the digital envelope opening password (cipher_open) specified when the digital certificate is sealed in a digital envelope image is inputted, the user select image (img_select) and the digital certificate can be separately extracted.

When the digital envelope image is stored with it combined with the digital certificate in the steps (A) to (F) described above, the digital envelope image is stored as shown in FIG. 6 (G).

Then, when the digital certificate and the user select image are separately stored in the steps (A) to (F) described above, they are separately stored as shown in FIG. 7 (G) and (I).

Encrypting and hiding a specific message (a digital certificate in the present invention) in a picture file or the like is referred to as steganography. There is no difference at all between a case containing a password and the opposite in appearance, and an encrypted picture file looks the same as a general file.

F5 (http://wwwrn.inf.tu-dresden.de/~westfeld/f5.html) developed in Germany, a secure engine hiding a text in a larger text, MP3 stego (http://www.petitcolas.net/fabien/steganography/mp3stego/) embedding a secret message in an MP3 file or the like are well-known steganography tools.

[Method and Computer Program Product for Hinding Information in an Indexed Color Image] of U.S. Pat. No. 6,697,498 B2 (issued on Feb. 24, 2004) can be employed as a method of sealing the created digital certificate in a digital envelope image.

However, embodiments of the present invention are not limited to the method disclosed in the U.S. patent, but include embodiments that can be implemented by those skilled in the art using the steganography technology. A steganography method for hiding data in a digital picture file is very specifically described in [Steganalysis of JPEG Images: Breaking the F5 Algorithm] [ISSN 0302-9743(Print) 1611-3349 (Online) Volume 2578/2003] (http://www.ws.binghamton.edu/fridrich/Research/f5.pdf). Since the method is apparent to those skilled in the art, detailed descriptions thereof will be omitted for brevity.

In a preferred embodiment of the present invention, the digital envelope image (img_envelope) in the step of sealing a digital envelope image (img_envelope) may include information on the service provider (info_provider) of the certificate agency.

Including information on the service provider (info_provider) refers to providing a list of information and the like available for a corresponding user among the services of a corresponding service provider. For example, if the service provider is an IPTV service provider, it can be regarded as providing information on affordable channels. The information on service provider (info_provider) included in the digital envelope image is extracted through the client installed in the user terminal, and the user can use the information.

Opening an digital envelope image will be described in detail with reference to the flowcharts shown in FIGS. 8a and 8b and exemplar views shown in FIGS. 9 to 12.

FIG. 8a is a flowchart illustrating the steps of opening a sealed and encrypted image transmitted to the user terminal and extracting and storing a digital certificate, and FIG. 8b is a flowchart illustrating the steps of storing the encrypted image transmitted to the user terminal in a sealed state and opening and using the encrypted image when the digital certificate is needed.

First, a case of extracting and storing a digital certificate will be described hereinafter.

Figure 9:
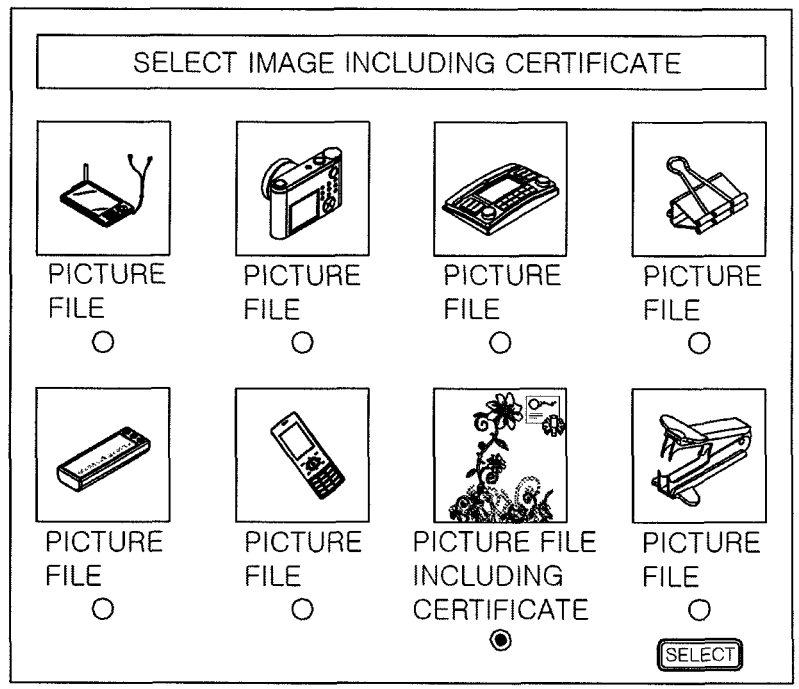
FIGS. 9 to 12 are views showing examples of a digital envelope image opening procedure and a method for selecting a user select image according to the present invention.

As shown in FIG. 8a, the client displays an image list including a digital envelope image (img_envelope) and at least one or more fake images shown in FIG. 9 (S901).

As a user's selection is required, the user selects an image (S902).

Here, it is determined whether the image selected by the user corresponds to the user select image (img_select) stored in the image server (S903).

Figure 12:
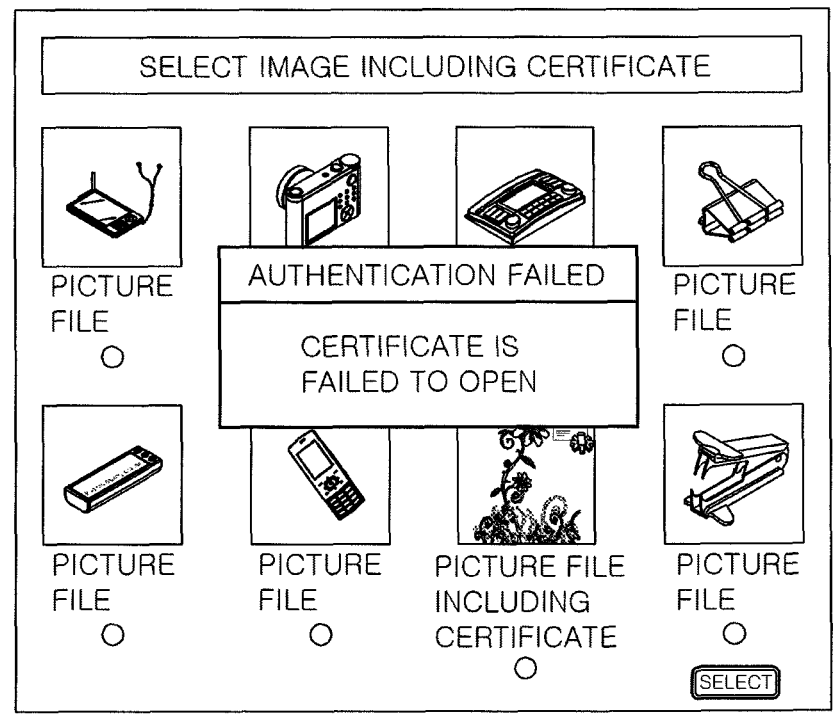

If they do not correspond to each other, an authentication failure message is displayed as shown in FIG. 12 and the digital certificate is abolished (S923).

If the image selected by the user corresponds to the user select image (img_select), the sealed digital envelope image is transmitted to the user terminal (S910).

Figure 10:
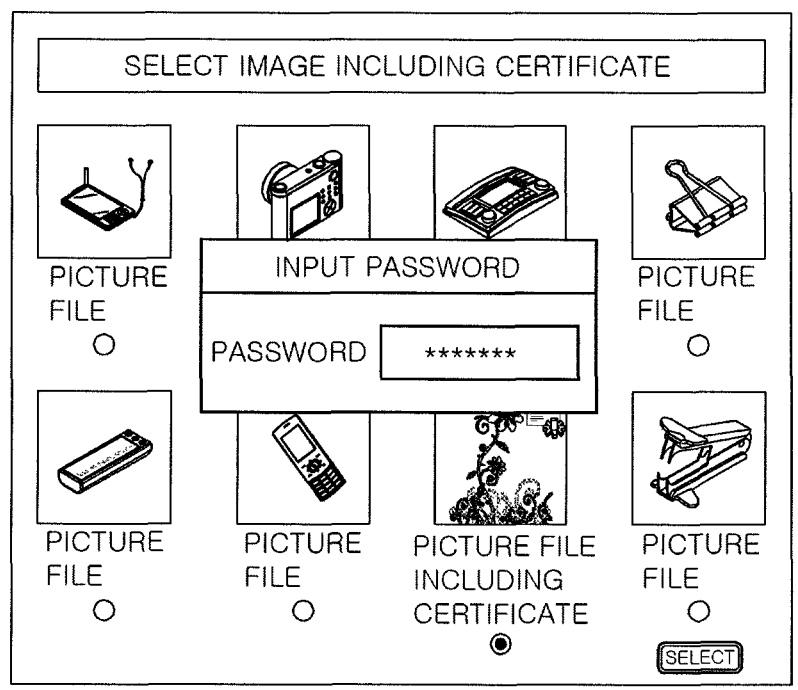

If the sealed digital envelope image is transmitted to the user terminal, the client requests input of a digital envelope opening password (cipher_open) as shown in FIG. 10 (S920).

If the user inputs a digital envelope opening password (cipher_open), it is determined whether the digital envelope opening passwords (cipher_open) correspond to each other (S921).

Figure 11:
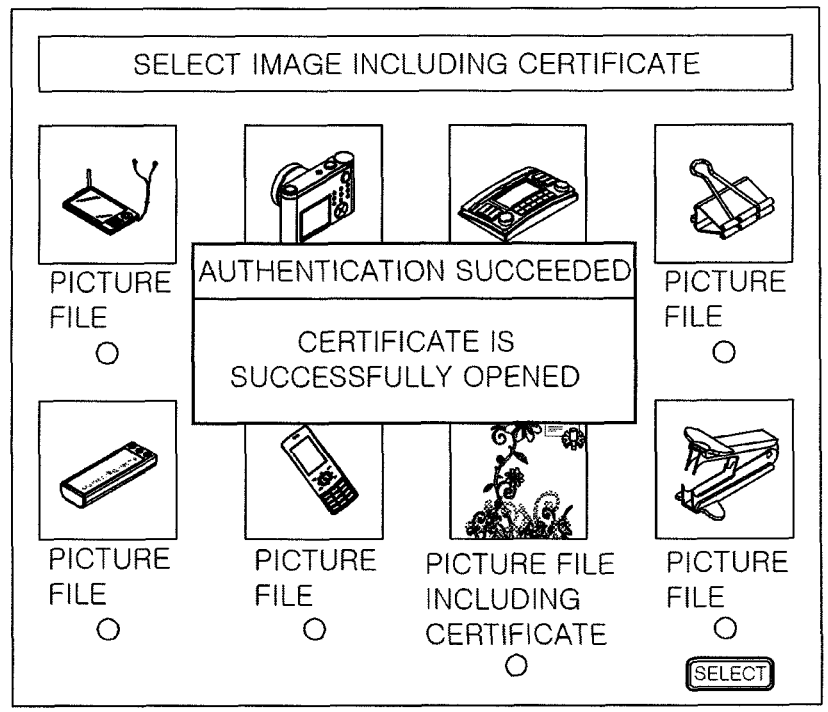

If the digital envelope opening passwords (cipher_open) do not correspond to each other, the screen of FIG. 12 is displayed, and the digital certificate is abolished (S923). If the digital envelope opening passwords (cipher_open) correspond to each other, after an authentication success message is displayed as shown in FIG. 11, the received digital envelope image (img_envelope) is decrypted, and the digital certificate and the user select image (img_select) are extracted (S922).

In FIG. 8a, steps S901 to S903 show a procedure performed before the digital envelope image that is sealed when the digital certificate is initially issued or re-issued is transmitted to the user terminal, and steps S920 to S923 show an opening procedure performed after the digital envelope image is transmitted to the user terminal.

FIG. 8a shows a procedure of extracting a digital certificate and a user select image (img_select) by opening the digital envelope image and then storing the extracted digital certificate and user select image (img_select).

FIG. 8b shows a case where the encrypted image transmitted to the user terminal is stored in a sealed state and opened when it is used.

As shown in FIG. 8b, the client displays an image list including a digital envelope image (img_envelope) and at least one or more fake images shown in FIG. 9 (S931).

As a user's selection is required, the user selects an image (S932).

Here, it is determined whether the image selected by the user corresponds to the user select image (img_select) stored in the image server (S933).

If they do not correspond to each other, an authentication failure message is displayed as shown in FIG. 12 and the digital certificate is abolished (S956).

If the image selected by the user corresponds to the user select image (img_select), the sealed digital envelope image is transmitted to the user terminal (S940).

The digital envelope image transmitted to the user terminal is stored in a sealed state, and if the user desires to extract and use the digital certificate (S951), the client requests input of a digital envelope opening password (cipher_open) as shown in FIG. 10 (S952).

If the user inputs a digital envelope opening password (cipher_open), it is determined whether the digital envelope opening passwords (cipher_open) correspond to each other (S953).

If the digital envelope opening passwords (cipher_open) do not correspond to each other, the screen of FIG. 12 is displayed, and the digital certificate is abolished (S956). If the digital envelope opening passwords (cipher_open) correspond to each other, after an authentication success message is displayed as shown in FIG. 11, the received digital envelope image (img_envelope) is decrypted, and the digital certificate and the user select image (img_select) are extracted, and then the extracted digital certificate is used (S954).

If using the extracted digital certificate is completed, the digital envelope image is stored in a sealed state (S950).

In FIG. 8b, steps S931 to S933 show a procedure performed before the digital envelope image that is sealed when the digital certificate is initially issued or re-issued is transmitted to the user terminal. Step S950 shows the digital envelope image stored in a sealed state, and steps S951 to S954 show opening and using the digital envelope image after an authentication procedure is performed.

In the procedure of transmitting and opening a sealed digital envelope image described above, it is also possible to combine a method of confirming a user using a user select image (img_select) and a method of confirming a user using user's biological information as an authentication procedure performed before the sealed digital envelope image is transmitted to the user terminal.

In addition, as an authentication step for extracting the digital certificate transmitted to the user terminal, it is also possible to confirm a user using the digital envelope opening password (cipher_open) and confirm user using the biological information.

Of course, in an authentication procedure performed before the sealed digital envelope image is transmitted to the user terminal and an authentication procedure for extracting the digital certificate transmitted to the user terminal, it is also possible to selectively combine a method of confirming a user using a user select image (img_select), a method of confirming a user using a digital envelope opening password (cipher_open) and a method of confirming a user using user's biological information, or all of the confirming methods can be used.

In the system and method for issuing a digital certificate using an encrypted image according to the present invention described above, an authentication procedure is performed before a digital envelope image created by combining the digital certificate with a user select image is transmitted to the user terminal, and if the authentication procedure is failed, the sealed digital envelope image is not transmitted to the user terminal.

In addition, an authentication procedure is also performed on the sealed digital envelope image transmitted to the user terminal, and if the authentication procedure is failed, the sealed digital envelope image is not opened.

According to a preferred embodiment of the present invention, the user terminal 1 includes devices available in all kinds of electronic commerce transactions, such as a PC, PDA, cellular phone and the like, which includes all of electronics devices capable of connecting to and communicating with a proxy server in wired or wireless communications.

A digital certificate storage apparatus of the user terminal 1 includes a local disk, an optical storage device, a portable storage device or an IC card of the user terminal 1.

According to another embodiment of the present invention, if the user terminal 1 is a cellular phone equipped with a SIM/USIM card, a digital envelope opening password (cipher_open) is not separately specified or created, but the phone number or serial number of the SIM/USIM card, International Mobile Equipment Identity (IMEI), a terminal manufacture number or a combination thereof can be used as a password.

A procedure of creating a digital envelope image and a digital envelope opening password by combining a digital certificate with a user select image in a proxy server has been described above.

Hereinafter, a method of determining a user select image (img_select) will be described with reference to FIGS. 13 to 18.

Figure 13:
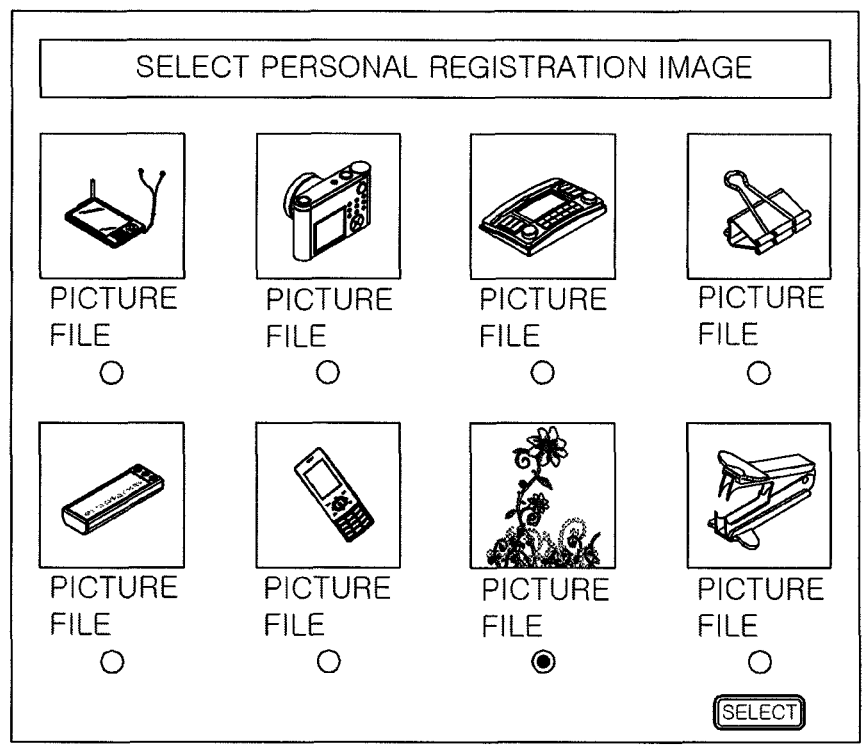
FIGS. 13 to 18 are views showing examples of a method for displaying a digital certificate list according to the present invention.
Figure 14:
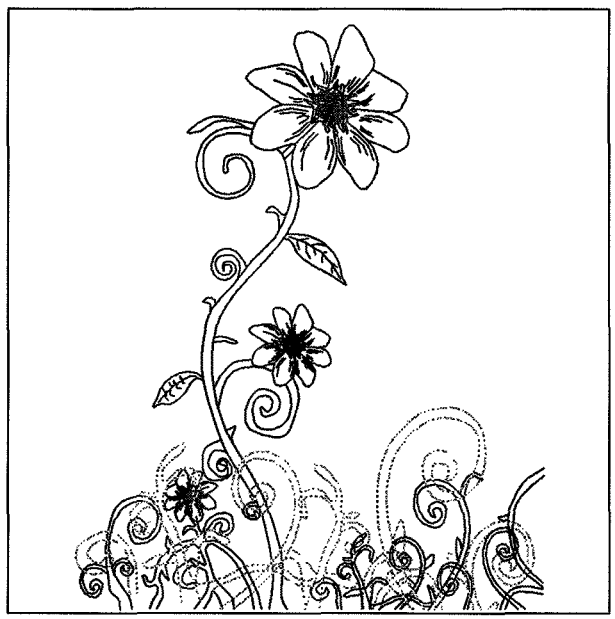
Figure 15:

A first method is to select an image which is easy for a user to remember among the images provided by a certificate agency as a user select image (img_select) as shown in FIG. 13, which can be performed through a terminal of the proxy server 2.

A second method is to input an image randomly selected by a user into the proxy server 2 in the form of a picture file through a terminal of a certificate agency as a user select image (img_select).

In this case, the user should prepare the randomly selected image in advance and transfer the image to the certificate agency through a portable storage device, e-mail or the like. For example, if the user has a great liking in a picture of flower shown in FIG. 14, the user can select the picture as his or her user select image (img_select). Accordingly, fraudulent users cannot make out which is the digital envelope containing the digital certificate of the user even through phishing or hacking.

A third method is to construct a user select image (img_select) in the form of an avatar by selectively combining basic components provided by the certificate agency.

Here, a user can select a gender (or a species of animal when an avatar is expressed as an animal), hairstyle, shirts, pants, shoes, caps, accessories and the like of a character as elements that the user can select in order to configure the avatar. Since complexity of selection can be increased by providing such a variety of selecting elements, it is possible to prevent fraudulent users from opening the sealed digital envelope image.

The object of the three methods for selecting a user select image (img_select) described above is to confuse fraudulent users so as not to find out the digital envelope used by the digital certificate user. Generally, the fraudulent users steal personal information (info_personal) by hacking keyboard input signals, and a user select image (img_select) selected through the three methods uses an image association effect, and thus it has an effect of preventing theft of third parties as a defense means when a digital certificate is lost or a system is accessed through hacking.

In addition, the user select image (img_select) may include a logo of a certificate agency, a logo of a certificate authority and an expiry date regardless of a selection method. An embodiment thereof will be described with reference to FIG. 15.

An image selected by the user is expressed at the center (which shows an avatar constructed in the third method), and then a logo of a financial institution (a certificate agency) is expressed on the upper part of the image, and a log of a digital certificate issuance institution (certificate authority) is expressed on the lower part of the image.

Figure 16:
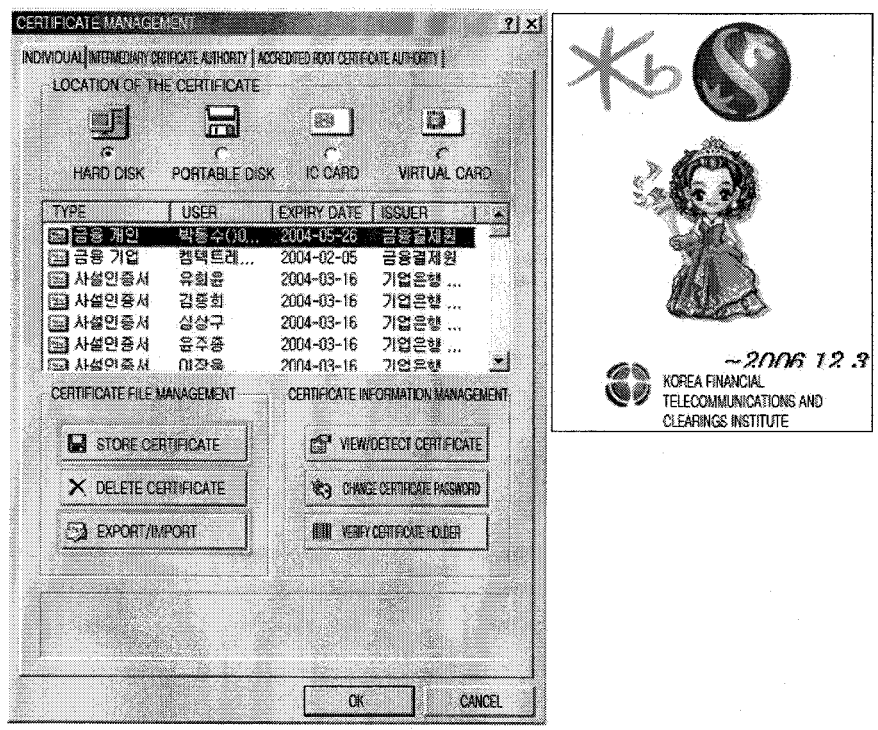

Such a user select image (img_select) is utilized not only for encryption when the digital certificate is issued, but also as a method for displaying the user select image (img_select) when the client executed in the user terminal 1 displays a digital certificate list, as shown in FIG. 16.

Such a configuration allows a user to know usage, expiry data or the like of a digital certificate only by viewing the envelope of the digital certificate and thus enhances recognizability and intuitiveness.

Figure 17:
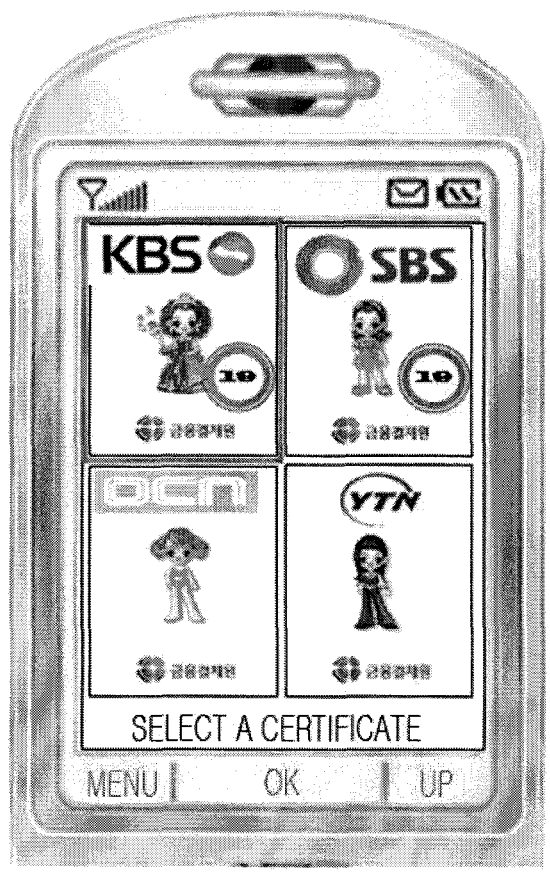

In addition, as shown in FIG. 17, when displaying a digital certificate list, the client can arrange and display thumbnails of user select images (img_select). Such a configuration further enhances recognizability and intuitiveness of the user.

Figure 18:

FIG. 18 shows an example of a screen displayed when the user selects a specific digital certificate from the list shown in FIG. 17. Particularly, it shows a case of using a cellular phone as the user terminal 1.

According to another embodiment of the present invention, a user select image (img_select) may include a user-registered sound source. The user-registered sound source may include a guide to digital certificate notifications, a personal information (info_personal) file, a content file related to the user or the like. Owing to such a configuration, contents of a digital certificate can be effectively transferred to visually disabled persons as well as non-disabled persons when the digital certificate is used.

The detailed configuration of a digital certificate issuing system applying a digital certificate issuing method using an encrypted image according to the present invention will be described below.

Figure 19A:
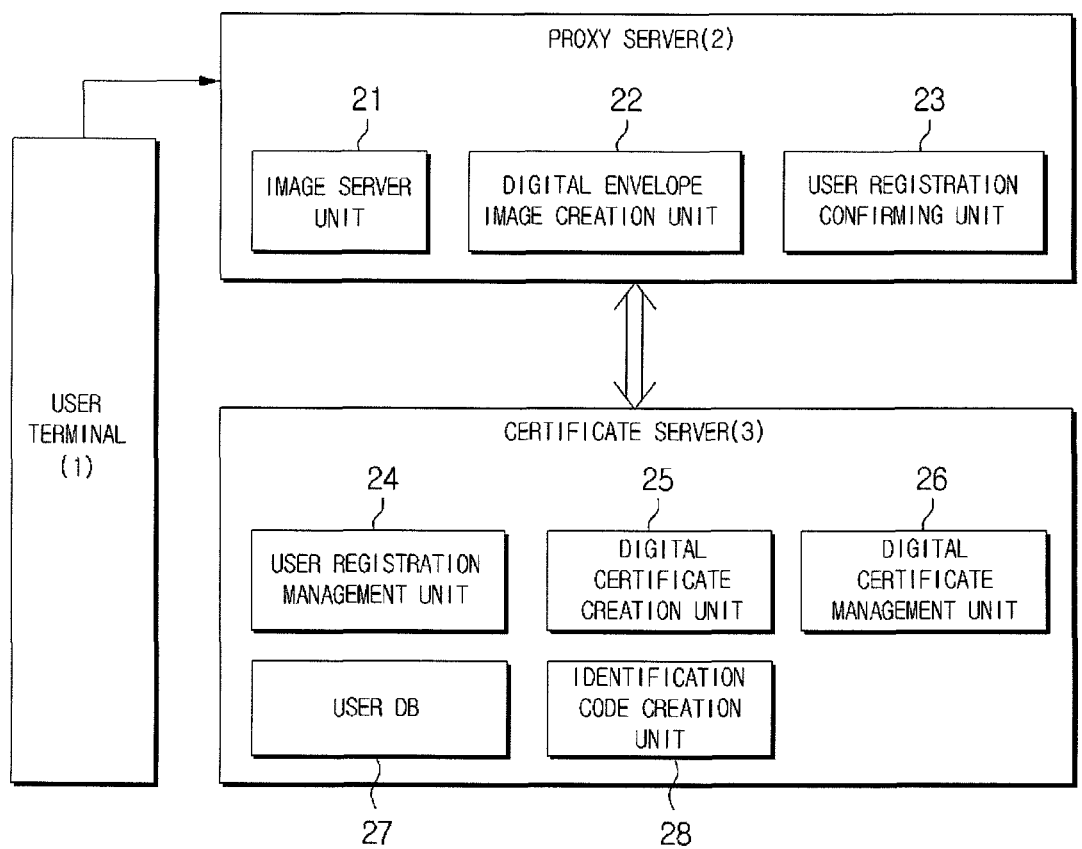
FIGS. 19a and 19b are block diagrams showing the detailed configuration of a digital certificate issuing system according to the present invention.
Figure 19B:
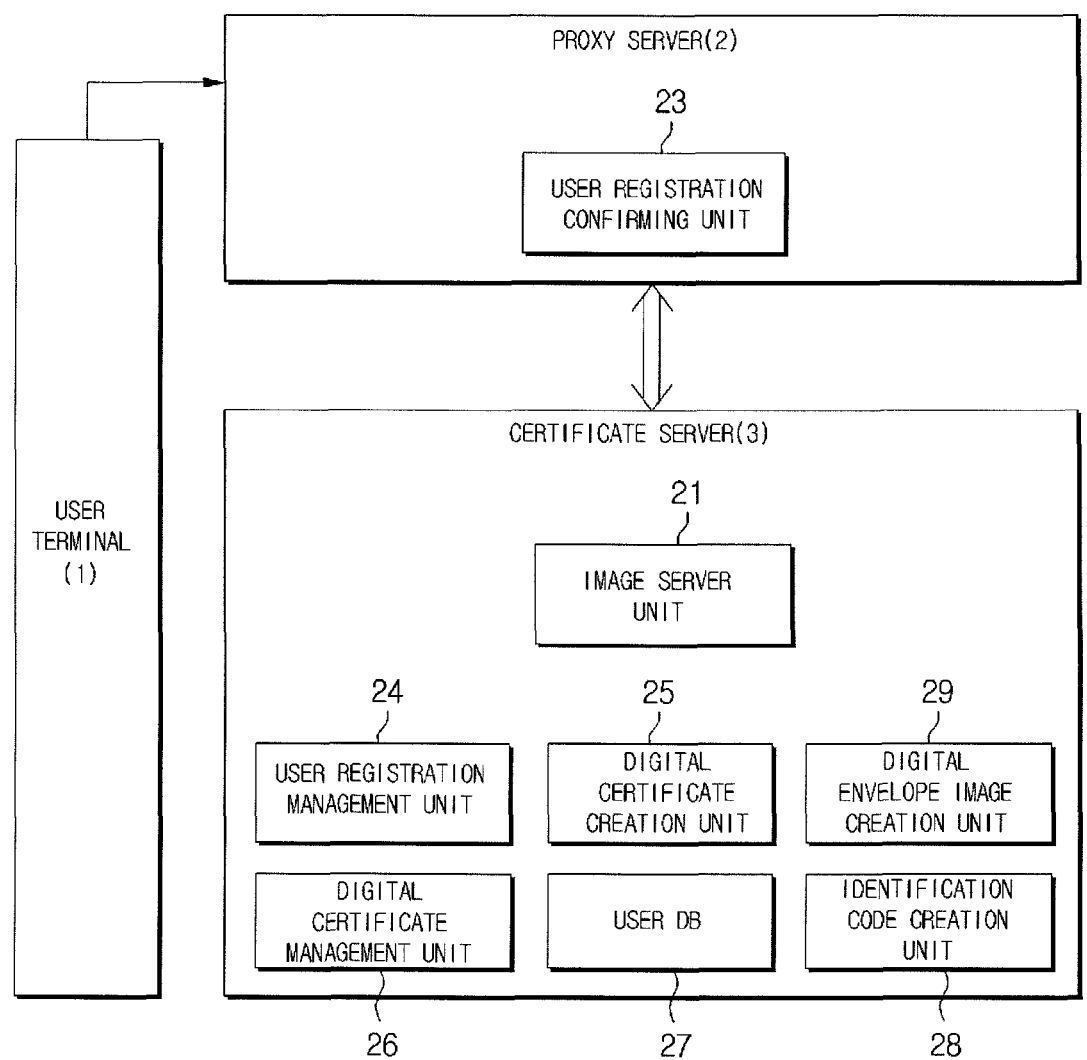

FIGS. 19a and 19b are block diagrams showing the detailed configuration of a digital certificate issuing system according to the present invention.

A system for implementing the present invention largely comprises a user terminal 1, a proxy server 2 and a certificate server, and the three constitutional components are connected through the Internet.

First, FIG. 19a is a block diagram showing the configuration of a system performing a procedure of issuing, updating and re-issuing a digital certificate in a proxy server by registering and sealing a digital envelope image.

As shown in FIG. 19a, the proxy server 2 comprises an image server unit 21 for storing a user select image (img_select), a digital envelope image creation unit 22 for creating a digital envelope image (img_envelope) by encrypting and combining a digital certificate created by a certificate authority with the user select image (img_select) stored in the image server unit 21 and a user registration confirming unit 23 for registering identity of a user in the step of applying for issuance of a digital certificate, and the certificate server 3 comprises a user DB 27 for storing personal information of a user (info_personal) included in issuance application data (data_application) of the user and a user identification code (code_identify), an identification code creation unit 28 for creating the user identification code (code_identify) such as a reference number, an authentication code or the like included in the issuance application data (data_application) for the user who applies for issuance of the digital certificate, a user registration management unit 24 for confirming registration of the user who applies for issuance of the digital certificate through confirmation of the user identification code, a digital certificate creation unit 25 for creating the digital certificate using a public key included in digital certificate issuance request data (data_request), and a digital certificate management unit 26 for registering the created digital certificate in a directory server unit and disclosing a state of the created digital certificate.

FIG. 19b is a block diagram showing the configuration of a system performing a digital certificate issuing, updating and re-issuing procedure in a certificate server by registering and sealing a digital envelope image.

As shown in FIG. 19b, the proxy server 2 comprises a user registration confirming unit 23 for registering identity of a user in the step of applying for issuance of a digital certificate, and the certificate server 3 comprises a user DB 27 for storing personal information of a user (info_personal) included in issuance application data (data_application) of the user and a user identification code (code_identify), an identification code creation unit 28 for creating the user identification code (code_identify) such as a reference number, an authentication code or the like included in the issuance application data (data_application) for the user who applies for issuance of the digital certificate, a user registration management unit 24 for confirming registration of the user who applies for issuance of the digital certificate through confirmation of the user identification code, a digital certificate creation unit 25 for creating the digital certificate using a public key included in digital certificate issuance request data (data_request), a digital certificate management unit 26 for registering the created digital certificate in a directory server unit and disclosing a state of the created digital certificate, an image server unit 21 for storing a user select image (img_select), a digital envelope image creation unit 29 for creating a digital envelope image (img_envelope) by encrypting and combining a digital certificate created by a certificate authority with the user select image (img_select) stored in the image server unit 21 and a user registration confirming unit 23 for registering identity of a user in the step of applying for issuance of a digital certificate.

In the digital certificate issuing system according to the present invention, although it is not shown in the figure, the proxy server 2 comprises an issuance application data management unit for collecting digital certificate issuance request data (data_request) and transmitting the request data to the certificate server, and an identification code issuing unit for receiving the user identification code (code_identify) and issuing the user identification code (code_identify) to the user.

In addition, if the user terminal 1 is an apparatus mounted with various kinds of central processing units (CPUs) and capable of installing and executing an application and connecting to the Internet (e.g., a PC, PDA, cellular phone or the like), the digital certificate issuing system can be implemented through the application, and thus those skilled in the art can implement needed functions through programming.

The application (client) comprises a signature key-pair creation module (a key pair creation unit) for creating at least one public and private key pair, a digital envelope opening module for requesting input of a digital envelope opening password (cipher_open) and determining whether the inputted password is matched to a stored password, a digital certificate extraction module (a digital certificate decryption unit) for decrypting the digital envelope image (img_envelope) and extracting the digital certificate and the user select image (img_select), and a data storage unit for storing the extracted digital certificate and user select image (img_select).

Although the digital certificate issuing system using an encrypted image according to the present invention as described above includes a configuration for creating a digital certificate in a proxy server and a configuration for creating a certificate server in a certificate server, it is, of course, to be understood that the user terminal can be constructed in another form if a user creates the digital certificate.

Since the digital certificate issuing system using an encrypted image according to the present invention issues, updates, re-issues and stores a digital certificate through an image-based user confirmation procedure, but not a text-based user confirmation procedure, the abuse of the digital certificate caused by injustice of a third party can be prevented.

In the case where a digital certificate is issued, updated and re-issued by registering and sealing a digital envelope image in a server of a certificate agency such as a bank, a hospital, a contents providing company or the like, but not in a server of a certificate authority that creates the digital certificate, efficiency of authentication can be enhanced when a user uses certificate agencies having different standards.

In addition, since a user selects and seals a digital envelope image personally and backs up a backup copy of an encrypted image into a server of a and the like, the effect of preventing hacking attacks can be enhanced, and the stability and efficiency of the updating and re-issuing procedure can be enhanced.

The system and method for issuing a digital certificate using an encrypted image according to the present invention has following effects.

First, since a user is confirmed through an image, but not a text, a keyboard input is not required. Therefore, the abuse of a digital certificate caused by injustice use of a third party can be prevented by protecting acquisition of personal information through keyboard hacking.

Second, the present invention does not construct a new digital certificate issuing system, but is applied to a previously constructed and used digital certificate issuing system in order to issue, update and re-issue a digital certificate using an encrypted image. Therefore, the present invention is highly probable to be commercialized.

Third, since the present invention provides a display screen for displaying a list of digital certificates using digital envelope images, recognizability and intuitiveness of a user on information, such as the purpose use of the digital certificate, institutions using the digital certificate, expiry date of the digital certificate and like, can be enhanced when there are various kinds of digital certificates or the digital certificate is used in a cellular phone having a small display window.

Fourth, since a digital certificate is issued, updated and re-issued by registering and sealing a digital envelope image in a server of a certificate agency such as a bank, a hospital, a contents providing company or the like, not in a server of a certificate authority that creates the digital certificate, efficiency of authentication for using certificate agencies having different standards can be enhanced.

That is, the present invention is effective if it is applied to a digital certificate issuing, updating and re-issuing procedure of a variety of certificate agencies having a digital certificate issuing procedure of different standard.

Fifth, since a digital certificate can be created by a server of a certificate agency, a server of a certificate authority or a user terminal, the present can be applied in a way appropriate to a situation of a previously constructed digital certificate issuing system.

Sixth, since an issued digital certificate is stored in a sealed state in which it is combined with an encrypted image, and the digital certificate is extracted and used through a predetermined confirming procedure when the digital certificate is needed, leakage of the digital certificate can be prevented while the digital certificate is in a stored state, and the digital certificate can be prevented from being leaked and maliciously used while being stored.

Seventh, since a user, but not a server of a certificate authority creating a digital certificate, selects and seals a digital envelope image personally and backs up a backup copy of an encrypted image into a server of a certificate agency such as a bank, a hospital, an insurance company, a contents providing company and the like, the effect of preventing hacking attacks can be enhanced, and the stability and efficiency of the updating and re-issuing procedure can be enhanced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A system for issuing a digital certificate using encrypted images, the system comprising:
   a user terminal comprising a digital envelope opening module and a digital certificate extracting module;
   a proxy server for confirming identity of a user and transmitting the identity to a certificate server in order to request to issue digital certificate; and
   the certificate server for creating a digital certificate and creating a sealed digital envelope image by encrypting and combining the created digital certificate with a user select image.

2. The system according to claim 1, wherein the user terminal requests input of a digital envelope opening password and determines whether the inputted password is matched to a stored password through a digital envelope opening module, and a digital certificate extraction module decrypts the digital envelope image and extracts the digital certificate and the user select image only when the password is matched.

3. The system according to claim 2, wherein the user terminal is a cellular phone equipped with a SIM/USIM card, and the digital envelope opening password is a phone number or serial number of the SIM/USIM card, International Mobile Equipment Identity (IMEI), a terminal manufacture number or a combination thereof.

* * * * *